(12) United States Patent
Hornung et al.

(10) Patent No.: US 6,665,830 B2
(45) Date of Patent: Dec. 16, 2003

(54) SYSTEM AND METHOD FOR BUILDING A CHECKSUM

(75) Inventors: Bryan Hornung, Plano, TX (US); Gregory S Palmer, Plano, TX (US); Paul F. Vogel, Garland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 448 days.

(21) Appl. No.: 09/773,124

(22) Filed: Jan. 31, 2001

(65) Prior Publication Data

US 2002/0104056 A1 Aug. 1, 2002

(51) Int. Cl.[7] .............................................. G11C 29/00
(52) U.S. Cl. ........................ 714/766; 711/165; 714/767
(58) Field of Search .................... 711/165; 714/766–767

(56) References Cited

U.S. PATENT DOCUMENTS

| 4,695,947 A | 9/1987 | Ikeda et al. .................. 364/200 |
|---|---|---|
| 4,849,978 A | 7/1989 | Dishon et al. ................. 371/51 |
| 5,230,045 A | 7/1993 | Sindhu ........................ 395/425 |
| 5,446,691 A | 8/1995 | North et al. ........... 365/189.02 |
| 5,761,695 A | 6/1998 | Maeda et al. .................. 711/5 |
| 5,835,954 A | 11/1998 | Duyanovich et al. ....... 711/162 |
| 6,397,365 B1 * | 5/2002 | Brewer et al. .............. 714/766 |
| 6,490,668 B2 * | 12/2002 | Hornung et al. ............ 711/165 |

* cited by examiner

*Primary Examiner*—R. Stephen Dildine

(57) ABSTRACT

A system for building checksums efficiently builds a checksum of various data values that are stored in different memory units of a computer system. During the checksum build process, data stores to the memory locations storing the various data values are enabled, thereby enabling the checksum to be built without significantly impacting the performance of the computer system.

12 Claims, 15 Drawing Sheets

SYSTEM AND METHOD FOR BUILDING A CHECKSUM

BACKGROUND OF THE INVENTION

1. Field of the Invention

The present invention generally relates to data processing techniques and, in particular, to a system and method for efficiently building a checksum of a checksum set without restricting accessibility of the non-checksum values within checksum set.

2. Related Art

Large computer systems (e.g., servers) often employ a plurality of memory units to provide enough instruction and data memory for various applications Each memory unit has a large number of memory locations of one or more bits where data can be stored, and each memory location is associated with and identified by a particular memory address, referred to hereafter as a "memory unit address." When an instruction that stores data is executed, a bus address defined by the instruction is used to obtain a memory unit address, which identifies the memory location where the data is actually to be stored. In this regard, a mapper is often employed that maps or translates the bus address into a memory unit address having a different value than the bus address. There are various advantages associated with utilizing bus addresses that are mapped into different memory unit addresses.

For example, many computer applications are programmed such that the bus addresses are used consecutively. In other words, one of the bus addresses is selected as the bus address to be first used to store data. When a new bus address is to be utilized for the storage of data, the new bus address is obtained by incrementing the previously used bus address.

If consecutive bus addresses are mapped to memory unit addresses in the same memory unit, then inefficiencies may occur. In this regard, a finite amount of time is required to store and retrieve data from a memory unit. If two consecutive data stores occur to the same memory unit, then the second data store may have to wait until the first data store is complete before the second data store may occur. However, if the two consecutive data stores occur in different memory units, then the second data store may commence before the first data store is complete. To minimize memory latency and maximize memory bandwidth, consecutive bus addresses should access as many memory units as possible. This can also be described as maximizing the memory interleave.

As a result, the aforementioned mapper is often designed to map the bus addresses to the memory unit addresses such that each consecutive bus address is translated into a memory unit address in a different memory unit. For example, a bus address having a first value is mapped to a memory unit address identifying a location in a first memory unit, and the bus address having the next highest value is mapped to a memory unit address identifying a location in a second memory unit. Therefore, it is likely that two consecutive data stores from a single computer application do not occur in the same memory unit. In other words, it is likely that consecutive data stores from a computer application are interleaved across the memory units.

Backup systems are often employed to enable the recovery of data in the event of a failure of one of the memory units. For example, U.S. Pat. No. 4,849,978, which is incorporated herein by reference, describes a checksum backup system that may be used to recover the data of a failed memory unit. To backup data stored within the memory units of a typical computer system, one of the memory units in the computer system is designated as a checksum memory unit. Each location in the checksum memory unit is correlated with locations in the other non-checksum memory units. During operation, a checksum value is maintained in each memory location of the checksum memory unit according to techniques that will be described in more detail hereinbelow. Each checksum value may be utilized to recover any of the non-checksum data values stored in any of the memory locations correlated with the checksum memory location that is storing the checksum value. The checksum value stored in a checksum memory location and each of the non-checksum values stored in a location correlated with the checksum memory location shall be collectively referred to herein as a "checksum set."

Each location in the checksum memory unit is initialized to zero. Each data value being stored in a location of one of the non-checksum memory units is exclusively ored with the data value previously stored in the location of the one non-checksum memory unit. In other words, the data value being stored via a data store operation is exclusively ored with the data value being overwritten via the same data store operation. The result of the exclusive or operation is then exclusively ored with the value, referred to as the "checksum," in the correlated address of the checksum memory unit. The result of the foregoing exclusive or operation is then stored in the foregoing address of the checksum memory unit as a new checksum value.

When a memory unit fails, the data value stored in a location of the failed memory unit can be recovered by exclusively oring the checksum in the correlated location of the checksum memory unit with each of the values in the other memory units that are stored in locations also correlated with the location of the checksum. The process of maintaining a checksum and of recovering a lost data value based on the checksum is generally well known in the art.

During a recovery of a lost data value in a checksum set, many computer systems replace the checksum of the checksum set with the recovered data value. Since the checksum set no longer includes a checksum, the data values within the checksum set cannot be recovered in the event of another memory unit failure unless additional steps are taken to backup the data of the checksum set. An example of additional steps that may be taken to backup the checksum set includes installing an additional memory unit and storing a checksum of the checksum set in the additional memory unit.

However, building a checksum can be complicated, if the computer system is allowed to continue data stores to the checksum set during the checksum building. In this regard, data stores to the memory locations of the checksum set may change the values of the checksum set while the checksum is being built. If care is not taken to ensure that the checksum is appropriately updated to account for such updates to the checksum set, it is possible for the checksum to be inconsistent with the non-checksum values of the checksum set. Thus, to prevent errors in the checksum build process, most computer systems prohibit data writes to any memory location storing a non-checksum data value of the checksum set once the checksum build process is initiated. When the checksum build process is completed, data writes to the memory locations of the checksum set are again enabled. However, the inability of the computer system to service write requests to the checksum set during the checksum build process reduces the overall efficiency of the computer system.

Thus, a heretofore unaddressed need exists in the industry for providing a system and method for building a checksum for a checksum set within a computer system without requiring the computer system to temporarily stop servicing write requests that overwrite the data values of the checksum set.

SUMMARY OF THE INVENTION

The present invention overcomes the inadequacies and deficiencies of the prior art as discussed hereinbefore. Generally, the present invention provides a system and method for efficiently building a checksum of various data values that are stored in different memory units of a computer system. During the checksum build process, data stores to the memory locations storing the various data values are enabled, thereby enabling the checksum to be built without significantly impacting the performance of the computer system.

In architecture, the checksum building system of the present invention utilizes a plurality of memory units, a plurality of memory controllers, and an indicator. Each of the memory units has a plurality of memory locations for storing data, and each of the memory controllers is configured to access memory locations within a respective one of the memory units. One of the memory controllers is configured to build a checksum in one of the memory locations, and the indicator indicates which of the other memory controllers are enabled for updating the one memory location of the checksum.

In building the checksum, the one memory controller may be configured to perform the following steps: setting the indicator to indicate that each of the other memory controllers is disabled from updating the one memory location; transmitting, subsequent to the setting step, read-for-rebuild requests to each of the other memory controllers; receiving rebuild values that have been retrieved from the memory units in response to the read-for-rebuild requests; updating the one memory location with each of the rebuild values; and changing, for each rebuild value received by the one memory controller, the indicator to indicate that the transmitting memory controller is enabled for updating the one memory location.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
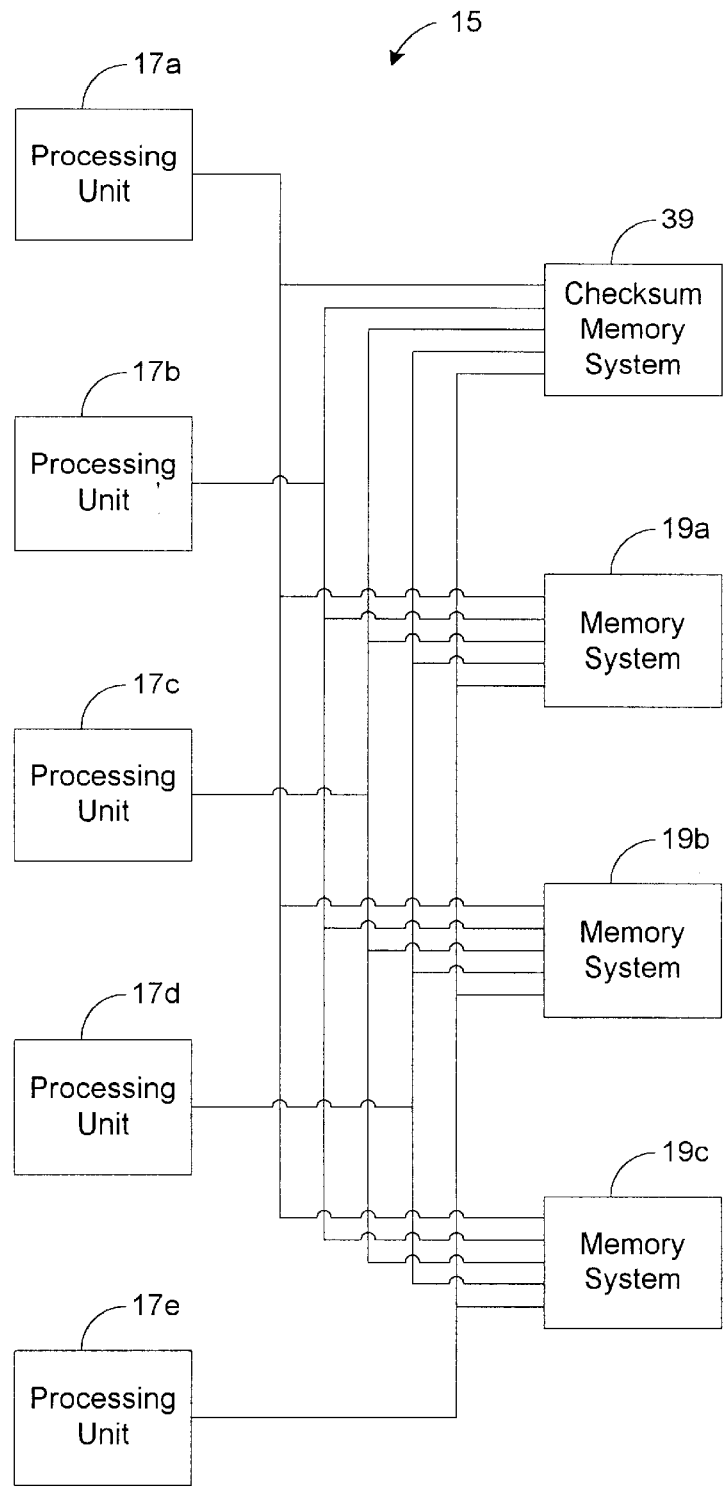
FIG. 1 is a block diagram illustrating a conventional processing system.
Figure 2:
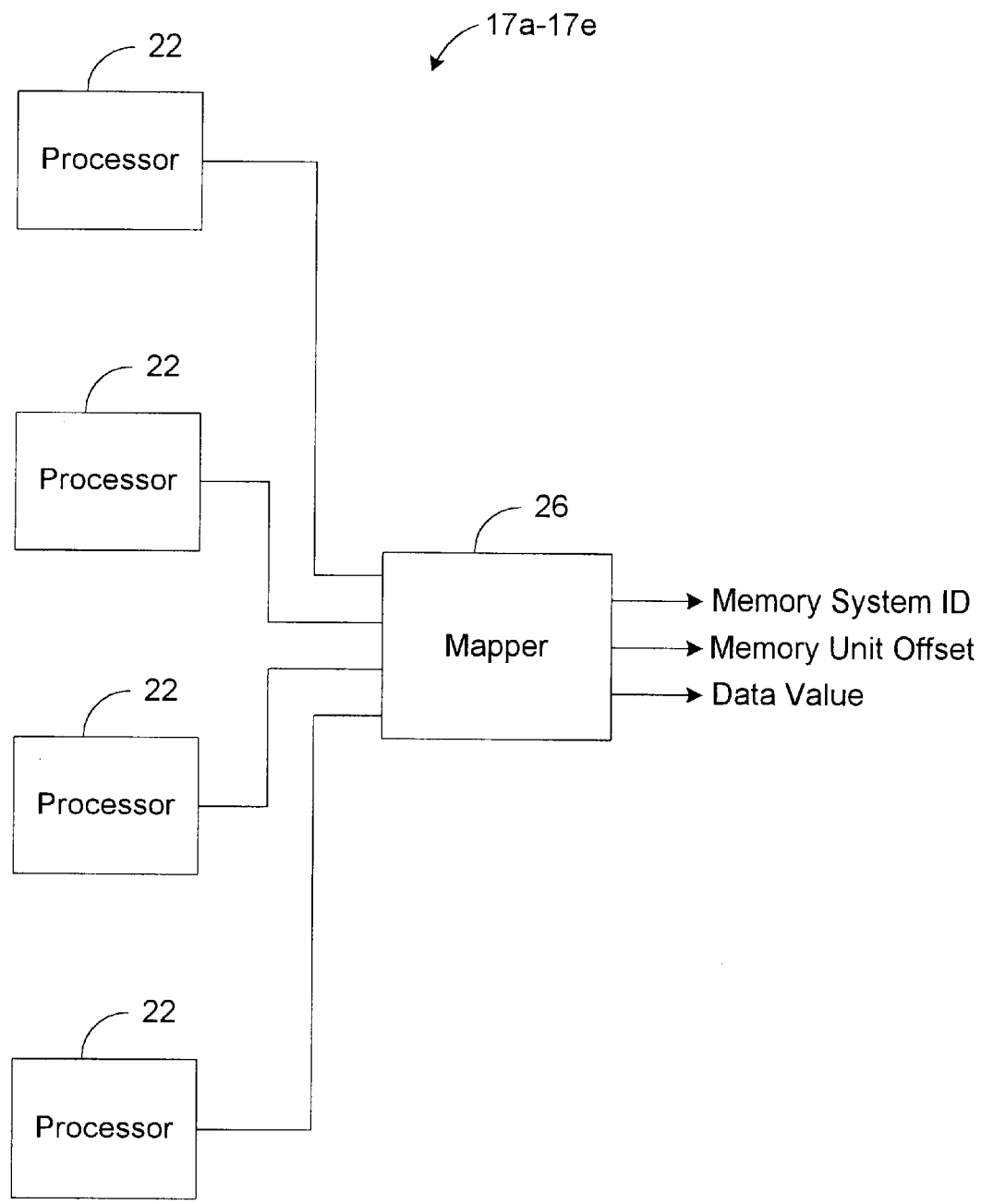
FIG. 2 is a block diagram illustrating a more detailed view of processing units depicted in FIG. 1.

FIG. 1 depicts a conventional processing system 15 including a plurality of processing units 17a–17e coupled to a plurality of memory systems 19a–19c. As shown by FIG. 2, each processing unit 17a–17e includes one or more processors 22 that are configured to execute instructions via techniques well known in the art. During execution, it is often necessary to retrieve and store data.

When a data value is to be stored in response to execution of an instruction by one of the processors 22, the processor 22 transmits a storage request to a mapper 26. The storage request includes the data value to be stored and a bus address indicative of where the foregoing data value is to be stored. The mapper 26 is configured to map the bus address into a memory unit address that includes a memory system identifier and a memory unit offset. The memory system identifier identifies one of the memory systems 19a–19c. The mapper 26 is configured to transmit a write request to each of the memory systems 19a–19c. The write request includes and is defined by the data value to be stored, the memory system identifier, and the memory unit offset.

Figure 3:
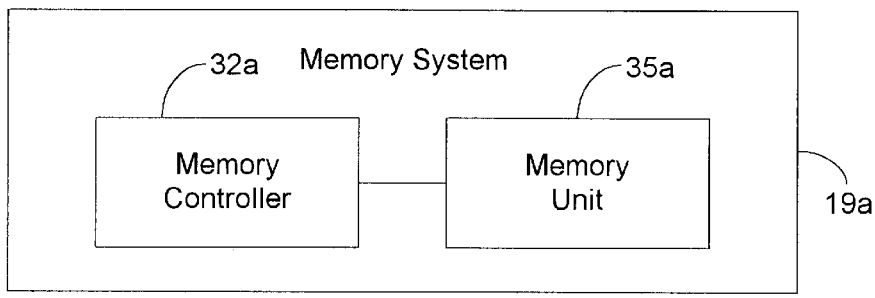
FIG. 3 is a block diagram illustrating a more detailed view of memory systems depicted in FIG. 1.
Figure 3:
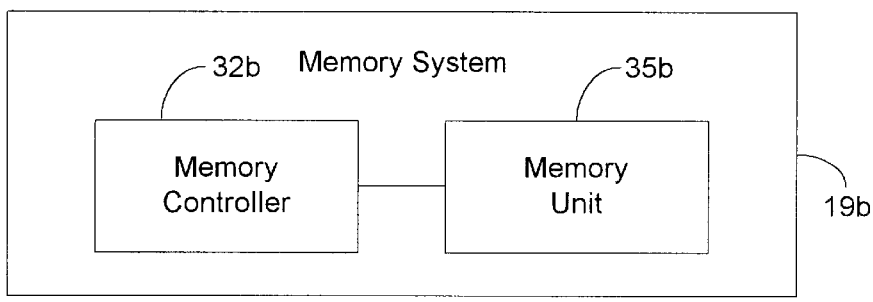
Figure 3:
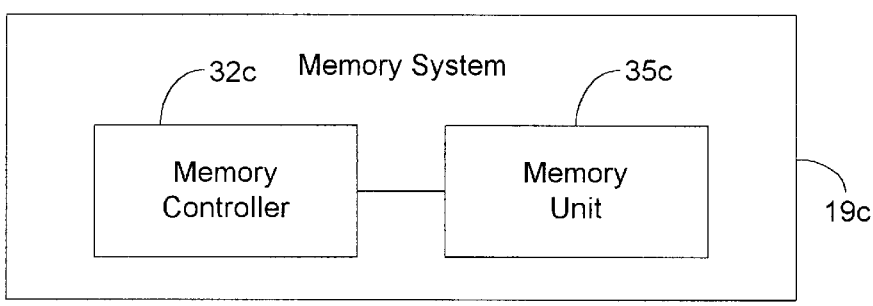
Figure 3:
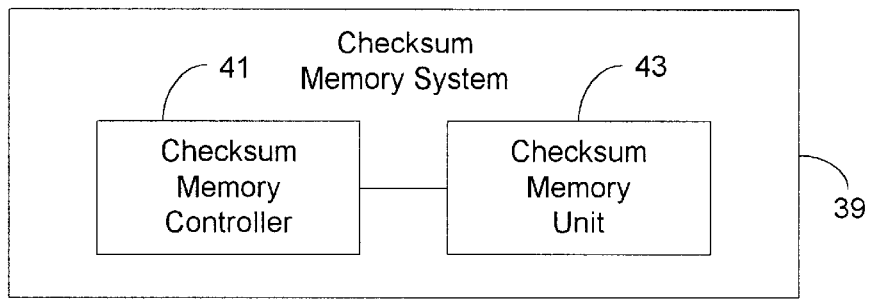

As shown by FIG. 3, each of the memory systems 19a–19c includes a memory controller 32a–32c, respectively, and a memory unit 35a–35c, respectively. Each of the memory units 3 5a–35c includes a plurality of memory locations where data can be stored and retrieved. The memory controller 32a–32c of the memory system 19a–19c identified by the aforementioned memory system identifier of the write request is configured to store the data value of the write request (i.e., the data value to be stored) into the memory unit 35a–35c of the identified memory system 19a–19c based on the memory unit offset. In this regard, the memory unit offset corresponds to a single location in each of the memory units 35a–35c, and the memory controller 32a–32c in the identified memory system 19a–19c is configured to store the received data value of the write request at the memory unit location corresponding to the memory unit offset.

To increase the performance of the processing system 15, the mapper 26 is configured to map consecutive bus addresses across the different memory systems 19a-19c in an interleaved fashion. For example, assume that each bus address from processors 22 is eight bits of binary information and can range from 00000000 to 11111111. The first four consecutive bus addresses are 00000000, 00000001, 00000010, and 00000011. Programmers typically utilize the bus addresses in consecutive order. Therefore, if the bus address 00000000 is initially used to store a data value, then it is likely that address 00000001 will be the next new bus address used to store data. Then, it is likely that bus address 00000010 will be used followed by bus address 00000011. This pattern is likely to be continued until no more new bus addresses are needed or until all of the bus addresses have been used.

To map the foregoing consecutive bus addresses across the memory systems 19a–19c in an interleaved fashion, the mapper 26 may map the first bus address (00000000) to a memory unit address having a memory system identifier that identifies memory system 19a. The mapper 26 may then map the second bus address (00000001) to a memory unit address having a memory system identifier that identifies memory system 19b. The mapper 26 may then map the third bus address (00000010) to a memory unit address having a memory system identifier that identifies the remaining memory system 19c. This process is repeated for each new bus address received by mapper 26. For example, when the mapper 26 receives a storage request including the fourth bus address (00000011), the mapper 26 maps the fourth bus address to a memory unit address having a memory system identifier that identifies memory system 19a.

Each bus address mapped to the same memory system 19a–19c is preferably mapped into a memory unit address having a different memory unit offset. Therefore, although a set of bus addresses is mapped to the same memory system 19a–19c, each of the bus addresses is mapped to a unique memory unit address. Accordingly, each bus address of the foregoing set is mapped to a different location in the same memory system 39a–39c.

Through techniques similar to the techniques previously described herein, data may be retrieved from the memory systems 19a–19c. In this regard, when one of the processors 22 executes an instruction to retrieve data, a retrieval request is transmitted by the processor 22 to the mapper 26 coupled to the processor 22. The retrieval request includes the bus address that indicates where the data is to be retrieved. The mapper 26 maps the bus address to a memory unit address including a memory system identifier and a memory unit offset. The memory system identifier identifies the memory system 19a–19c storing the requested data, and the memory unit offset corresponds to the location within the memory unit 35a–35c of the identified memory system 19a–19c where the data is actually stored.

The mapper 26 transmits a read request to each of the memory systems 19a19c in response to the retrieval request. The read request includes and is defined by the foregoing memory unit address translated from the bus address of the retrieval request. The memory controller 32a–32c of the memory system 19a–19c identified by the memory system identifier of the read request retrieves the data value in the associated memory unit 35a–35c at the location corresponding to the memory unit offset of the read request. The identified memory system 19a–19c then transmits the retrieved data value to the requesting processing unit 17a–17e. In this regard, the memory controller 32a–32c may return the retrieved data value to the mapper 26, which transmits this data value to the requesting processor 22 (i.e., the processor 22 that issued the aforementioned retrieval request), or the memory controller 32a–32c may transmit the data value to the requesting processor 22 without utilizing mapper 26.

As shown by FIG. 1, the processing system 15 also includes a checksum memory system 39 coupled to the processing units 17a–17e. As shown by FIG. 3, the checksum memory system 39, in architecture, is configured similar to the other memory systems 19a–19c. More specifically, the checksum memory system 39 includes a checksum memory controller 41 and a checksum memory unit 43. The checksum memory controller 41 is designed to store and retrieve data based on a memory unit address received by the checksum memory system 39. The checksum of each memory unit location in memory systems 19a–19c corresponding to the same memory unit offset is maintained in the memory unit location of the checksum memory unit 39 corresponding to the foregoing memory unit offset. In other words, each non-checksum data value of a checksum set is stored in one of the memory systems 19a–19c at a memory location identified by the same memory unit offset, and the checksum value of the checksum set is stored in the memory system 39 at the location identified by this same memory unit offset.

The values in the checksum memory unit 43 are initialized to zero. Each write request translated from a storage request by mapper 26 is transmitted to the other memory systems 19a–19c. As previously set forth, the memory controller 32a–32c of the memory system 19a–19c identified by the memory unit address of a transmitted write request is configured to store a data value of the write request into a memory unit location (referred to as the "destination location") corresponding to the memory unit offset of the memory unit address. Since a new value is stored into the destination location, a checksum update should be performed to update the checksum in the checksum set of the data value stored at the destination location. Therefore, in performing the data store, the memory controller 32a–32c of the identified memory system 19a–19c is also designed to exclusively or the data value being stored in the destination location with the data value previously stored in the destination location (i.e., with the data value overwritten in response to the write request). The foregoing memory controller 32a–32c then performs a checksum update by transmitting, to the checksum memory system 39, the result of this exclusive or operation and the memory unit offset correlated with the destination location. No further read or write operation to the destination location should begin occur until the checksum update is complete.

The checksum controller 41 is configured to exclusively or this result with the data value presently stored in the checksum memory unit location corresponding to the received memory unit offset (i.e., the memory unit offset identifying the destination location). The checksum memory controller 41 then stores the result of this exclusive or operation into the foregoing location of the checksum memory unit 43 (i.e., the checksum memory unit location storing the checksum of the checksum set that includes the data value of the destination location). Once this occurs, the checksum update is complete, and the location of the checksum memory unit 43 that is updated by the completed checksum update should be storing the checksum of the checksum set that includes the data value of the destination location. The checksum update should be allowed to finish even if the checksum memory controller 41 is concurrently rebuilding memory data from another memory controller 32a–32c in the same checksum set. By performing the aforementioned techniques for each data store that occurs in system 15, each location in the checksum memory unit 43 corresponding to a particular memory unit offset should be storing the checksum of the data values presently stored in the locations of memory units 35a–35c that correspond to the particular memory unit offset.

If any one of the memory systems 19a–19c fails, then the data values stored in the failed memory system 19a–19c can be recovered by using the data values in the checksum memory system 39. To recover a data value stored in a failed memory system 19a–19c, each data value in each of the other operable memory systems 19a–19c at a memory unit location corresponding to the same memory unit offset is exclusively ored with the checksum data value stored in the checksum memory unit 39 at the location corresponding to the foregoing memory unit offset. In other words, each non-checksum data value, except the lost data value, of the checksum set is exclusively ored with the checksum of the checksum set. The result of these exclusive or operations should be the data value stored in the failed memory system 19a–19c at the memory unit location corresponding to the same memory unit offset.

However, if the checksum is updated to account for the storage of a data value in one of the memory units 19a–19c during the foregoing exclusive or operations, then it is possible that an error in the data recovery process will occur. Thus, the transmission of write requests from the mapper 26 to the memory unit locations storing non-checksum values of a checksum set is normally prevented during any data recovery process that utilizes the checksum value within the checksum set. This prevents possible data errors during recovery processes but reduces the overall efficiency of the system 15.

Figure 4:
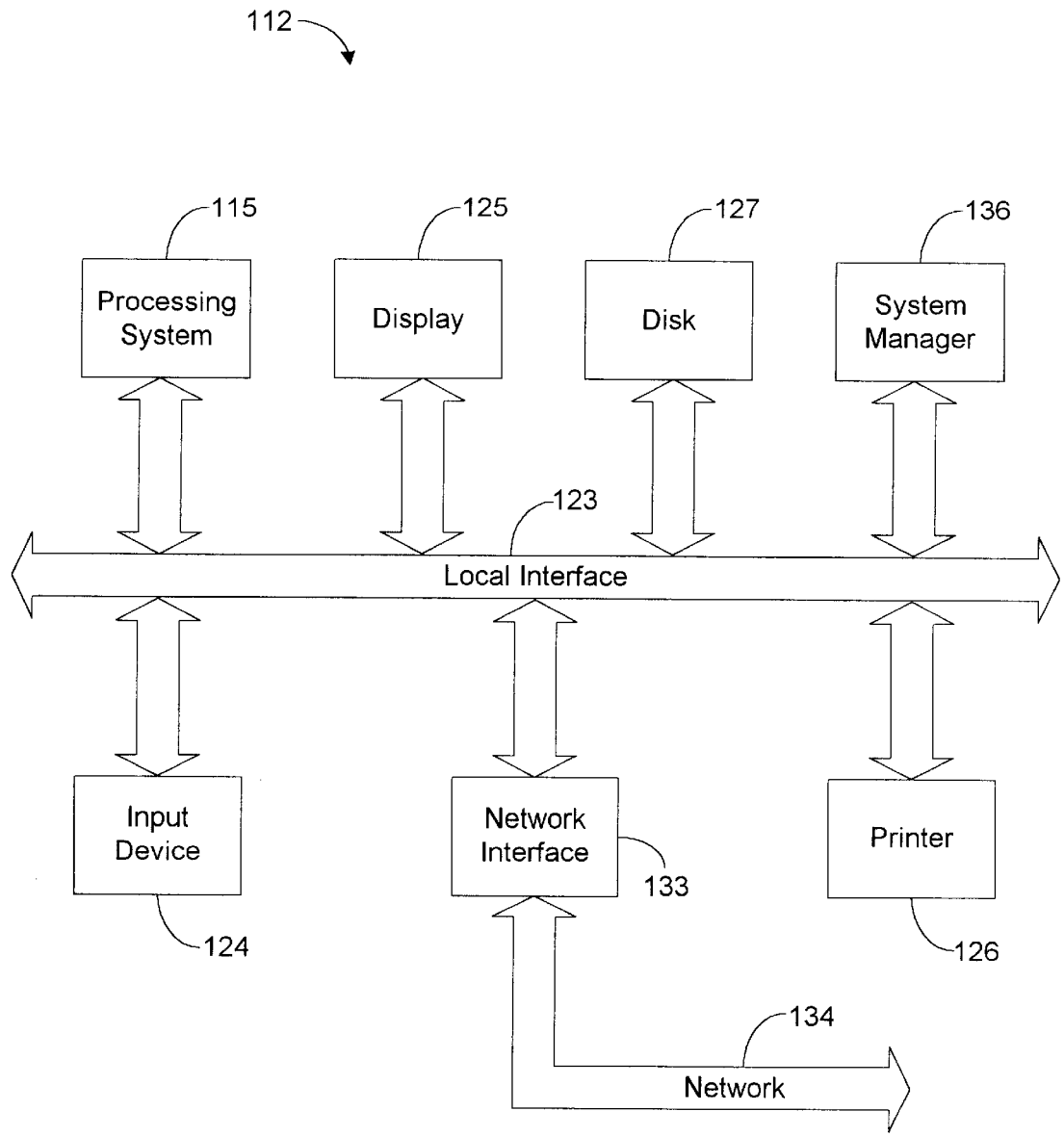
FIG. 4 is a block diagram illustrating a computer system that may be employed to implement the principles of the present invention.

FIG. 4 depicts a computer system 112 that may be utilized in implementing the present invention. As shown by FIG. 4, the computer system 112 includes a processing system 115 configured to execute instructions of computer applications that are preferably stored in memory included in the processing system 115. The processing system 115 communicates to and drives the other elements within the computer system 112 via a local interface 123, which can include one or more buses. Furthermore, an input device 124, for example, a keyboard or a mouse, can be used to input data from a user of the system 112, and screen display 125 or a printer 126 can be used to output data to the user. A disk storage mechanism 127 can be connected to the local interface 123 to transfer data to and from a nonvolatile disk (e.g., magnetic, optical, etc.). The system 112 can be connected to a network interface 133 that allows the system 112 to exchange data with a network 134.

The computer system 112 also includes a system manager 136 that is used in the preferred embodiment to control the operation of the computer system 112, as will be described in more detail hereinafter. The system manager 136 can be implemented in software, hardware, or a combination thereof Note that the system manager 136, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. For example, instructions defined by the system manager 136 can be executed by one or more processors in the processing system 115.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CD-ROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 5:
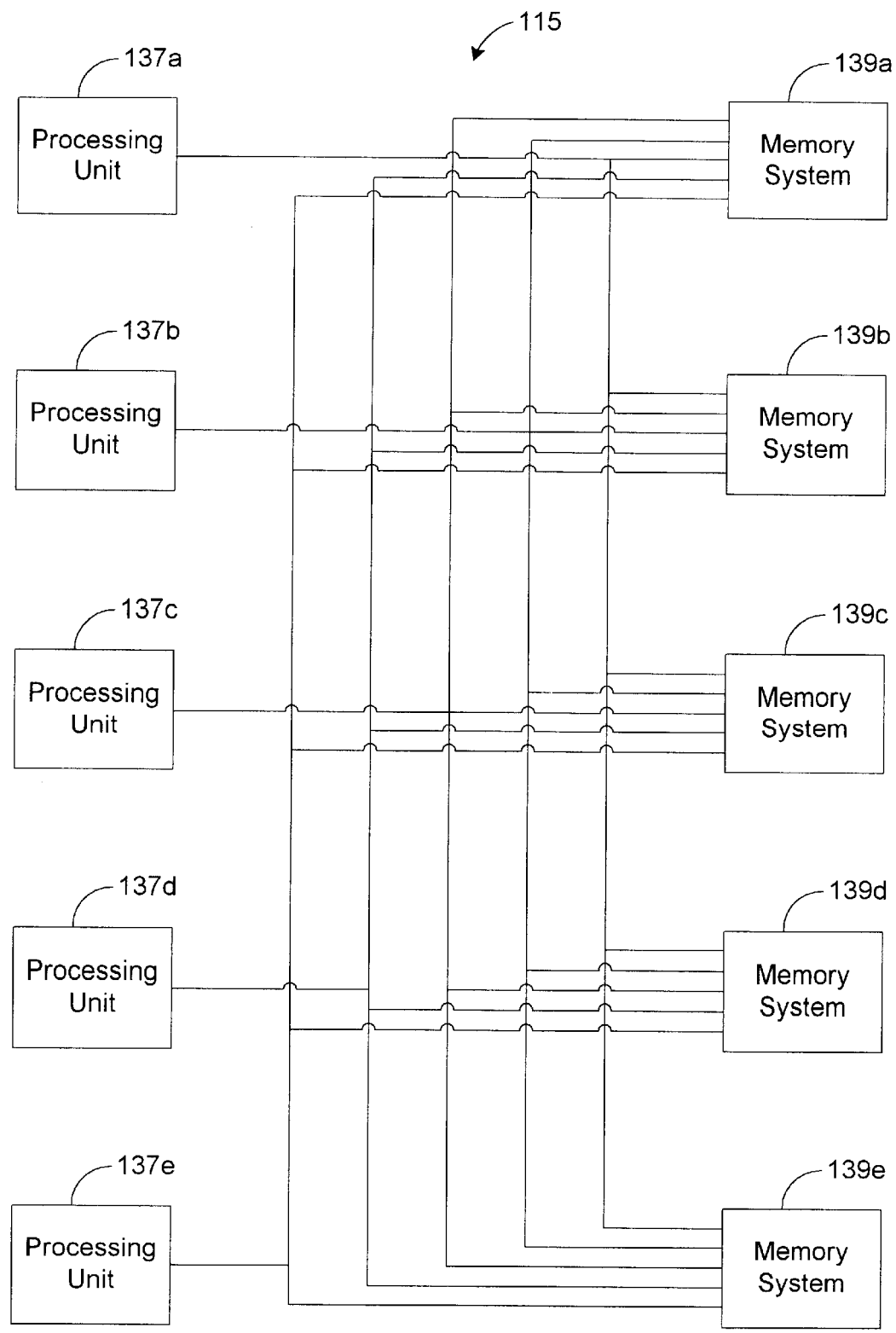
FIG. 5 is a block diagram illustrating a more detailed view of a processing system depicted in FIG. 4.
Figure 6:
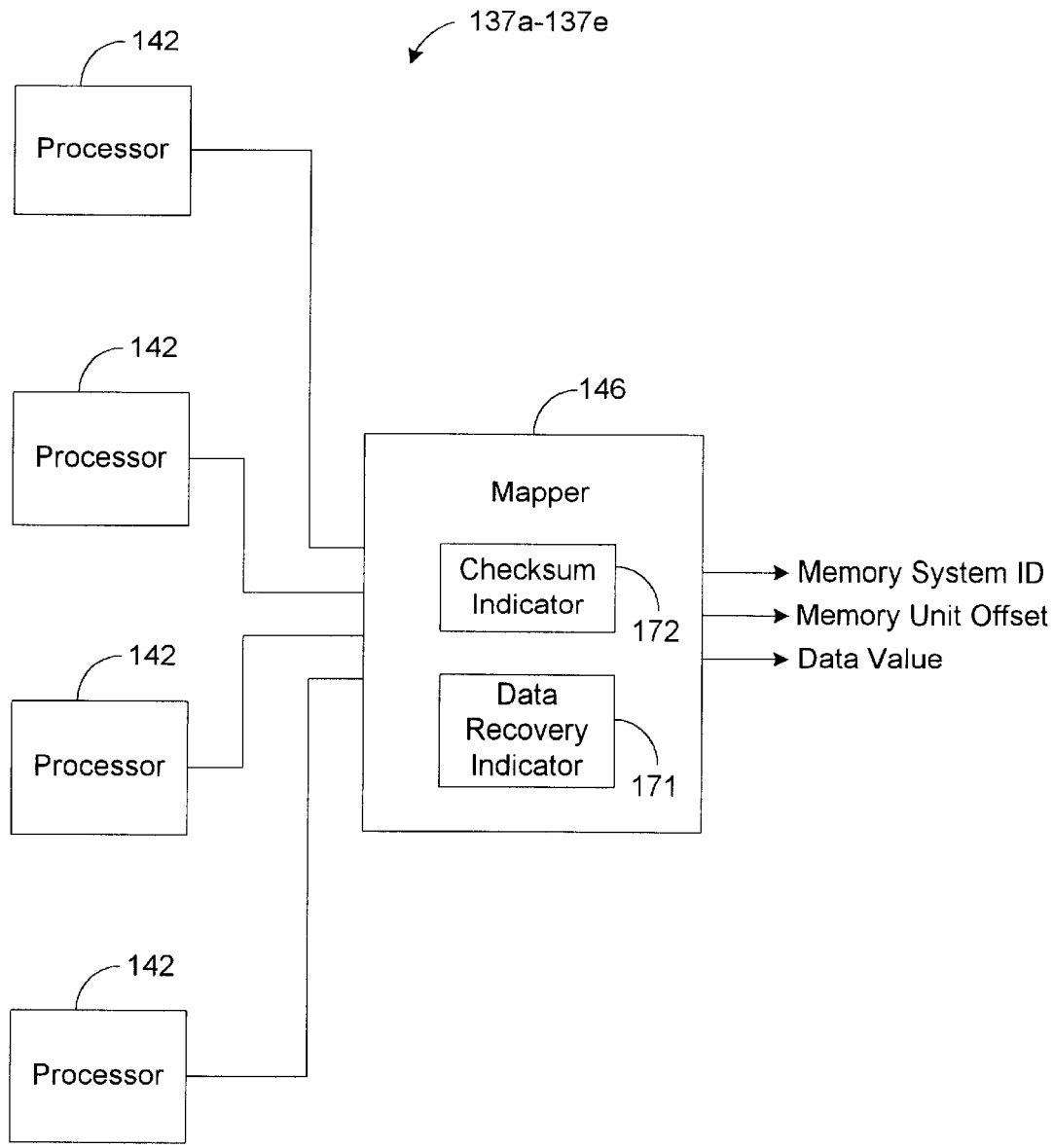
FIG. 6 is a block diagram illustrating a more detailed view of processing units depicted in FIG. 5.

As shown by FIG. 5, the processing system 115 includes a plurality of processing units 137a–137e coupled to a plurality of memory systems 139a–139e. As shown by FIG. 6, each processing unit 137a–137e includes one or more processors 142 that are configured to execute instructions via techniques well known in the art. These instructions are preferably defined by computer applications stored in one or more of the memory systems 139a–139e.

When a data value is to be stored in response to execution of an instruction by one of the processors 142, the processor 142 transmits a storage request to a mapper 146. The storage request includes the data value to be stored and a bus address indicative of where the foregoing data value is to be stored. The mapper 146 is configured to map the bus address into a memory unit address including a memory system identifier and a memory unit offset. The memory system identifier identifies one of the memory systems 139a–139e. The mapper 146 is configured to transmit a write request including the data value to be stored, the memory system identifier, and the memory unit offset to each of the memory systems 139a–139e. Note that, similar to the mapper 26 of conventional system 15, the mapper 146 preferably maps consecutive bus addresses to different memory systems 139a–139e in an interleaved fashion.

Figure 7A:
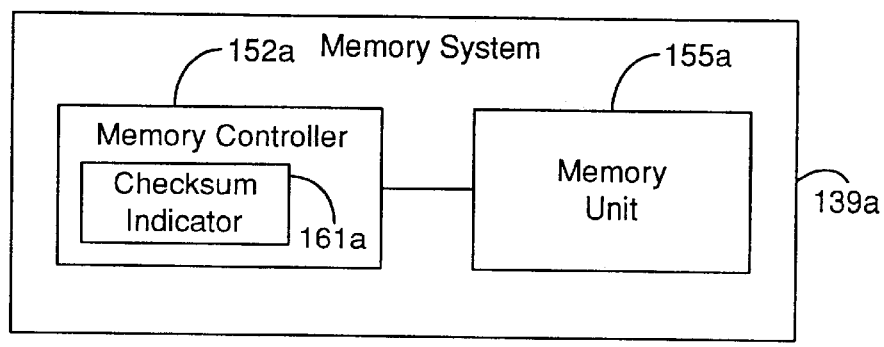
FIGS. 7A and 7B are block diagrams illustrating a more detailed view of memory systems depicted in FIG. 5.
Figure 7A:
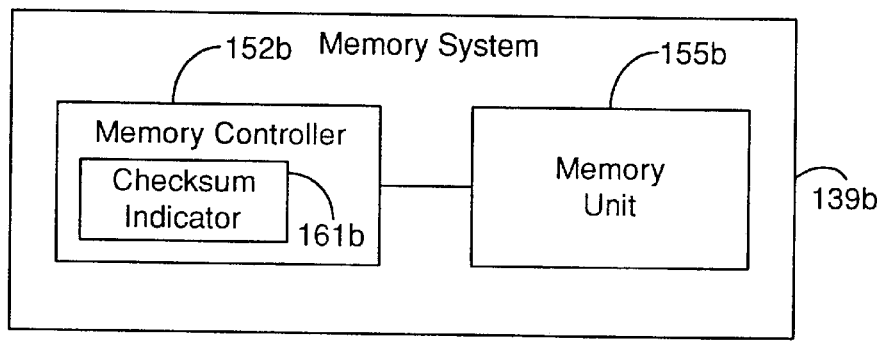
Figure 7A:
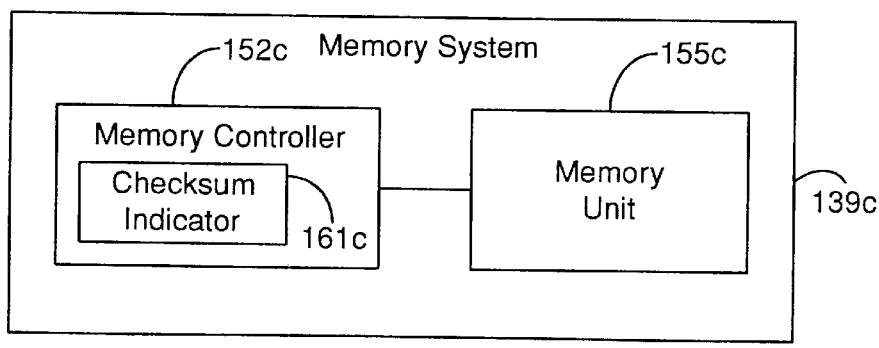
Figure 7B:
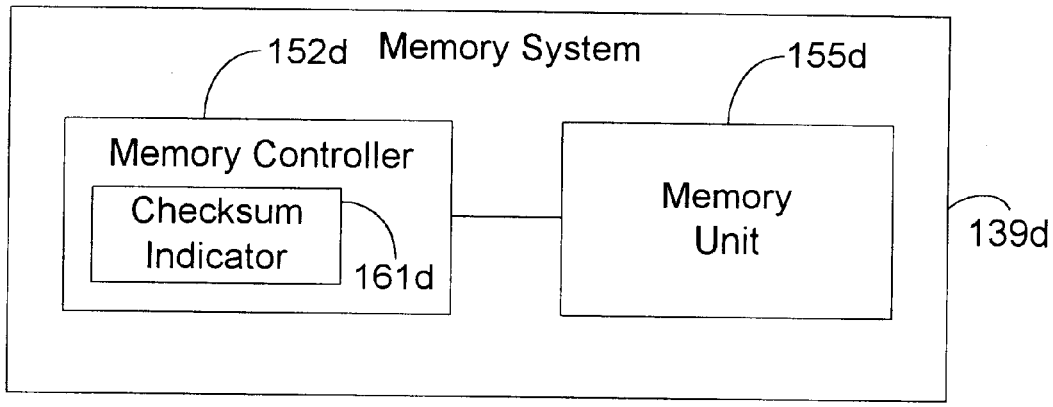
Figure 7B:
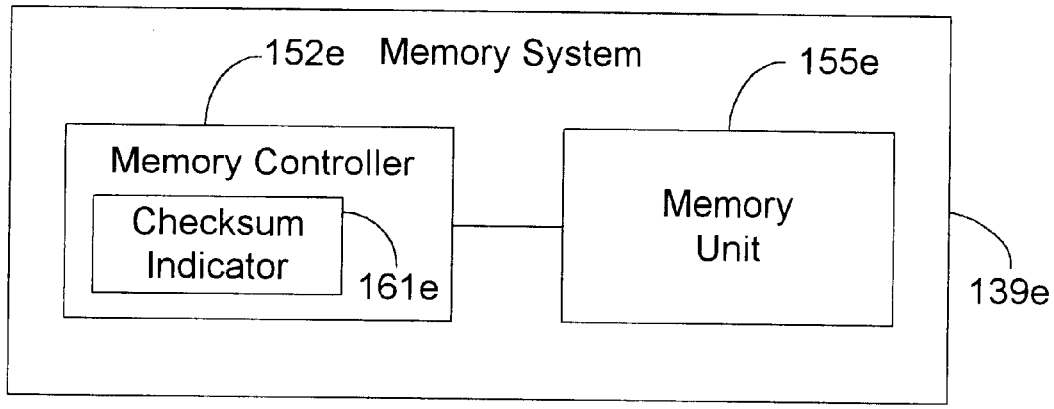

As shown by FIGS. 7A and 7B, each of the memory systems 139a–139e includes a memory controller 152a–152e, respectively, and a memory unit 15 5a–155e, respectively. Each of the memory units 155a–155e includes a plurality of memory locations where data can be stored and retrieved. The memory controller 152a–152e of the memory system 139a–139e identified by the aforementioned memory system identifier of the aforementioned write request is configured to store the data value to be stored (i.e., the data value received along with the memory system identifier and the memory unit offset) into the memory unit 155a–155e of the identified memory system 139a–139e based on the memory unit offset. In this regard, the memory unit offset identifies a single memory location in each of the memory units 155a–155e, and the memory controller 152a–152e in the identified memory system 139a–139e is configured to store, in the foregoing memory unit 155a–155e, the received data value at the location identified by the memory unit offset.

Each bus address mapped to the same memory system 139a–139e is preferably mapped into a memory unit address having a different memory unit offset. Therefore, although a set of bus addresses is mapped to the same memory system 139a–139e, each of the bus addresses is mapped to a unique memory unit address. Accordingly, each bus address mapped to the same memory system 139a–139e is mapped to a different location in the same memory system 139a–139e.

Through techniques similar to the techniques previously described herein, data may be retrieved from the memory units 155a–155e. In this regard, when one of the processors 142 executes an instruction to retrieve data, a retrieval request is transmitted by the processor 142 to the mapper 146 coupled to the processor 142. The retrieval request includes the bus address that indicates where the data is to be retrieved. The mapper 146 maps the bus address to a memory unit address including a memory system identifier and a memory unit offset. The memory system identifier identifies the memory system 139a–139e storing the requested data, and the memory unit offset identifies the location within the memory unit 155a–155e of the identified memory system 139a–139e where the data is actually stored.

The mapper 146 transmits a read request to each of the memory systems 139a139e in response to the retrieval request. The read request includes the foregoing memory unit address translated from the bus address of the retrieval request. The memory controller 152a–152e of the identified memory system 139a–139e retrieves the data value in the associated memory unit 155a–155e at the location identified by the memory unit offset and transmits this data value to the requesting processing unit 137a–137e. In this regard, the memory controller 152a–152e may return the foregoing data value to the mapper 146, which transmits this data value to the requesting processing unit 137a–137e, or the memory controller 152a–152e may transmit the data value to the requesting processing unit 137a–137e without utilizing mapper 146.

Figure 8:
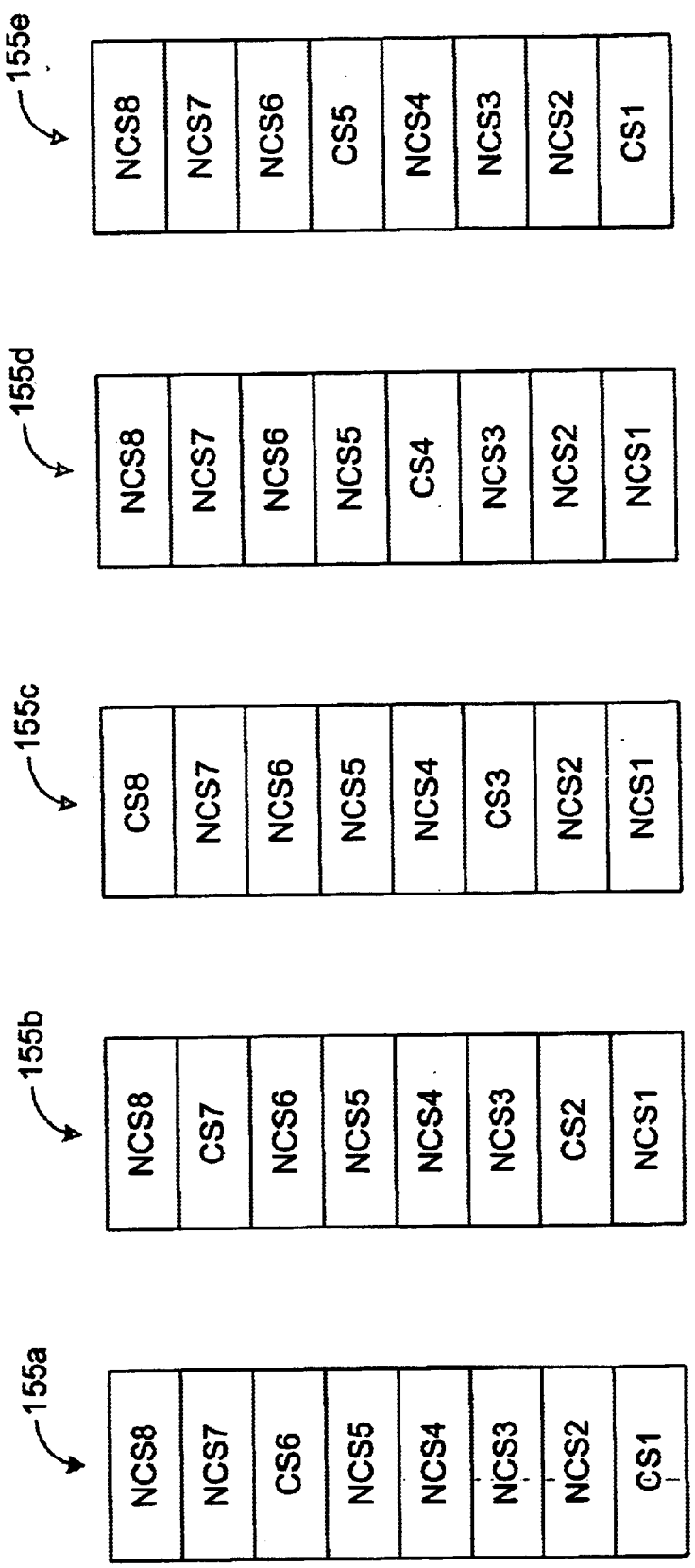
FIG. 8 is a block diagram illustrating a more detailed view of memory units depicted in FIGS. 7A and 7B.

FIG. 8 depicts a more detailed view of each of the memory units 155a–155e. In FIG. 8, checksum values or checksums are stored within portions CS1–CS8 and non-checksum values are stored within portions NCS1–NCS8. As in conventional system 15, the checksum value and the non-checksum values of the same checksum set are stored at memory locations having the same memory unit offset. In other words, each checksum value within one of the memory systems 139a–139e represents the checksum for each data value stored at the memory locations that are within the other memory systems 139a–139e and that are correlated with the same memory unit offset as the memory location of the checksum value. However, the checksums are preferably interleaved across the different memory systems 139a–139e, as shown by FIG. 8, for example.

Referring to FIG. 8, assume that the memory locations within portion CS1 ("checksum 1") of memory unit 155a are correlated with the same memory unit offsets as the memory locations within portions NCS1 ("non-checksum 1") of memory units 155b-155e. Therefore, the checksum of the values within portions NCS1 at memory locations correlated with the same memory unit offset should be stored in portion CS1 at the memory location that is correlated with the foregoing memory unit offset. Similarly, assume that the memory locations within portions CS2–CS8 are correlated with the same memory unit offsets as the memory locations within portions NCS2–NCS8, respectively. Thus, the checksums of the values within portions NCS2–NCS8 should be stored in portions CS2–CS8, respectively. For example, the checksum of the values within portions NCS2 at memory locations correlated with the same memory unit offset should be stored in portion CS2 at the memory location that is correlated with the foregoing memory unit offset, and the checksum of the values within portions NCS3 at memory locations correlated with the same memory unit offset should be stored in portion CS3 at the memory location that is correlated with the foregoing memory unit offset.

Thus, instead of having the checksums stored within a single memory unit 43 (FIG. 3) as in conventional system 15, the checksums are stored in different memory units 155a–155e. As a result, checksum updates may be interleaved across the memory units 155a–155e. U.S. patent application Ser. No. 09/699,877, entitled "Data Storage System and Method," and filed on Oct. 30, 2000, which is incorporated herein by reference, describes in more detail how the system 115 can be configured to enable checksums to be interleaved across the memory units 155a–155e, as shown by FIG. 8. It should be noted that the techniques for recovering data values based on the checksums, which will be described in further detail hereinafter, may be employed when the checksums are stored in the same memory unit 43 (FIG. 3), as described for conventional system 15.

Figure 9:
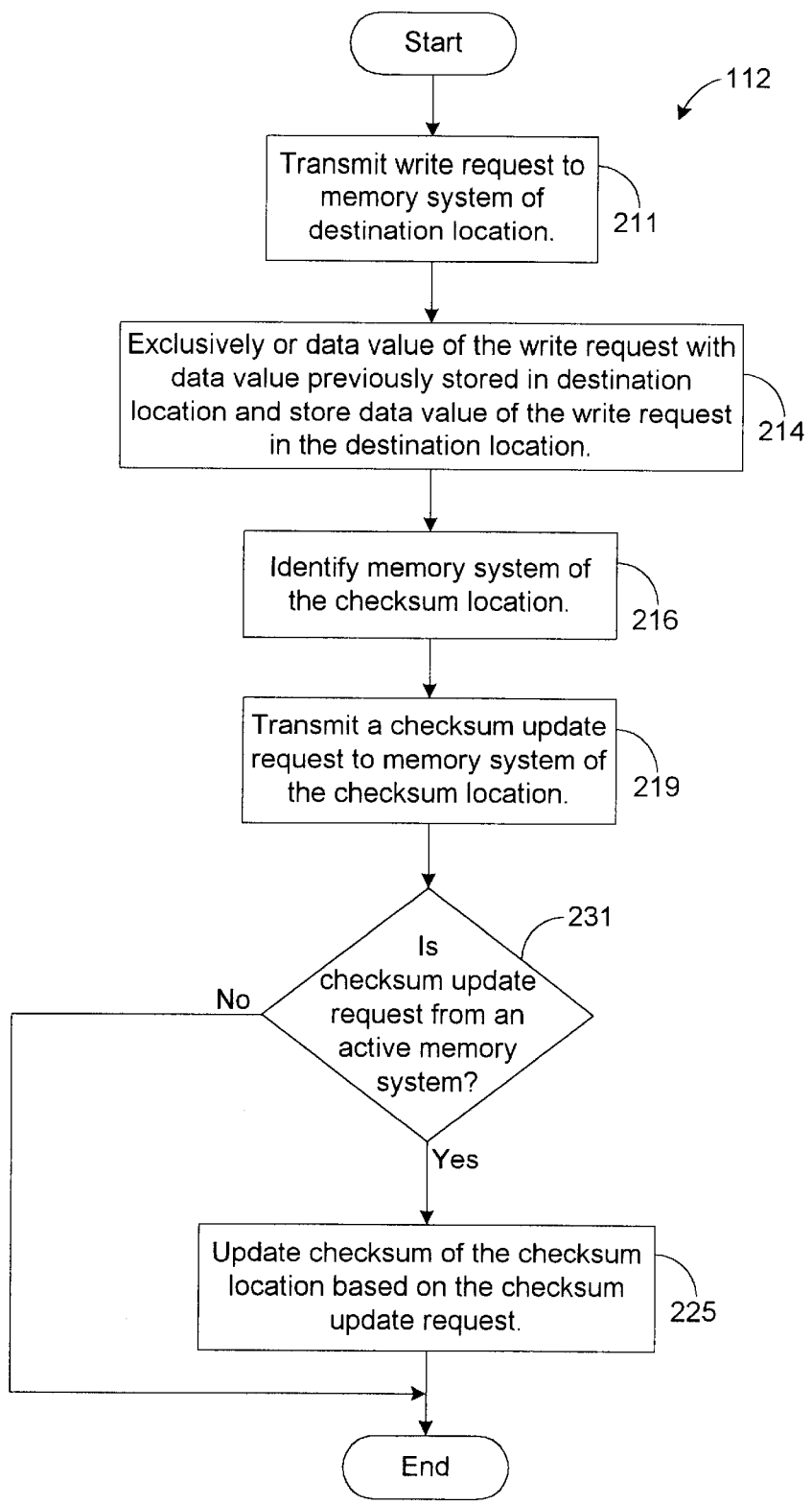
FIG. 9 is a flow chart illustrating the architecture and functionality of the computer system of FIG. 4 in storing a data value to one of the memory systems of FIG. 5.

To better illustrate how checksums are maintained within memory units 155a–155e, assume that memory system 139b receives, in block 211 of FIG. 9, a write request for storing a data value at one of the memory locations in portion NCS1 of memory unit 155b. As described hereinbefore, the one memory location (referred to hereafter as the "destination") within portion NCS1 should be correlated with a particular memory unit offset. The checksum of the value already stored at the destination before the occurrence of the write request should be stored in portion CS1 of memory unit 155a at the memory location (referred to hereafter as the "checksum location") correlated with the same memory unit offset.

In response to the write request, the memory controller 152b exclusively ors the data value of the write request (i.e., the data value to be stored) with the data value previously stored in the destination and then stores, in the destination, the data value of the write request, as shown by block 214 of FIG. 9. As depicted by blocks 216 and 219 of FIG. 9, the result of the exclusive or operation is then transmitted by the memory controller 152b in a second write request (a "checksum update request"), which identifies the memory controller 152a of the memory system 139a that includes the checksum location. In this regard, this checksum update request includes at least a memory system identifier identifying the memory system 139a, the result of the exclusive or operation, and the memory unit offset correlated with the destination.

This checksum update request is transmitted to each of the other memory systems 139a, 139c–139e by the memory controller 152b. In response to the checksum update request, the memory controller 152a updates, in block 225 of FIG. 9, the checksum stored in the checksum location provided that the condition in block 231, which will be described in more detail hereafter, is satisfied. More specifically, the memory controller 152a in block 225 exclusively ors the checksum stored at the checksum location with the exclusive or result transmitted from memory controller 152b in block 219 of FIG. 9. The result of the exclusive or operation performed by memory controller 152a is then stored in the checksum location. As a result, the checksum at the checksum location has been updated for the data value that was stored in the destination in block 214 of FIG. 9.

As described above, when a memory controller 155a–155e stores a data value in a destination memory location in response to a write request from mapper 146, the memory controller 155a–155e, in block 214 of FIG. 9, should exclusively or the data value to be stored with the data value previously stored in the destination memory location. The result of this exclusive or operation should then be transmitted, in block 219 of FIG. 9, to the memory system 139a–139e that is storing the checksum associated with the destination location so that the checksum may be updated.

To enable identification of which memory system 139a–139e is storing the checksum associated with the destination location, the memory controllers 152a–152e preferably maintain checksum indicators 161a–161e, respectively, as shown by FIGS. 7A and 7B. Each checksum indicator 161a–161e, for each particular memory location within the memory system 139a–139e, indicates which memory system 139a–139e is storing the checksum of the data value presently stored in the particular memory location.

Thus, in the example described above, the checksum indicator 161b maintained by the memory controller 152b should indicate that memory system 139a is storing the checksum associated with the destination (i.e., is storing a checksum at a memory location correlated with the same memory unit offset as the destination). Therefore, after the memory controller 152b exclusively ors the data value to be stored in the destination with the data value previously stored in the destination, the memory controller 152b, in block 216, analyzes the checksum indicator 161b to determine which of the other memory systems 139a and 139c–39e is storing the checksum associated with the destination. Based on the checksum indicator 161b, the memory controller 152b should identify memory system 139a and, therefore, transmit to the memory controller 152a an update checksum request that identifies the memory system 139a and, therefore, the memory controller 152a. This checksum update request includes the result of the exclusive or operation performed by the memory controller 152b in block 214 of FIG. 9. In response, the memory controller 152a, in block 225 of FIG. 9, updates the checksum associated with the destination based on the exclusive or result, as described above.

Figure 10:
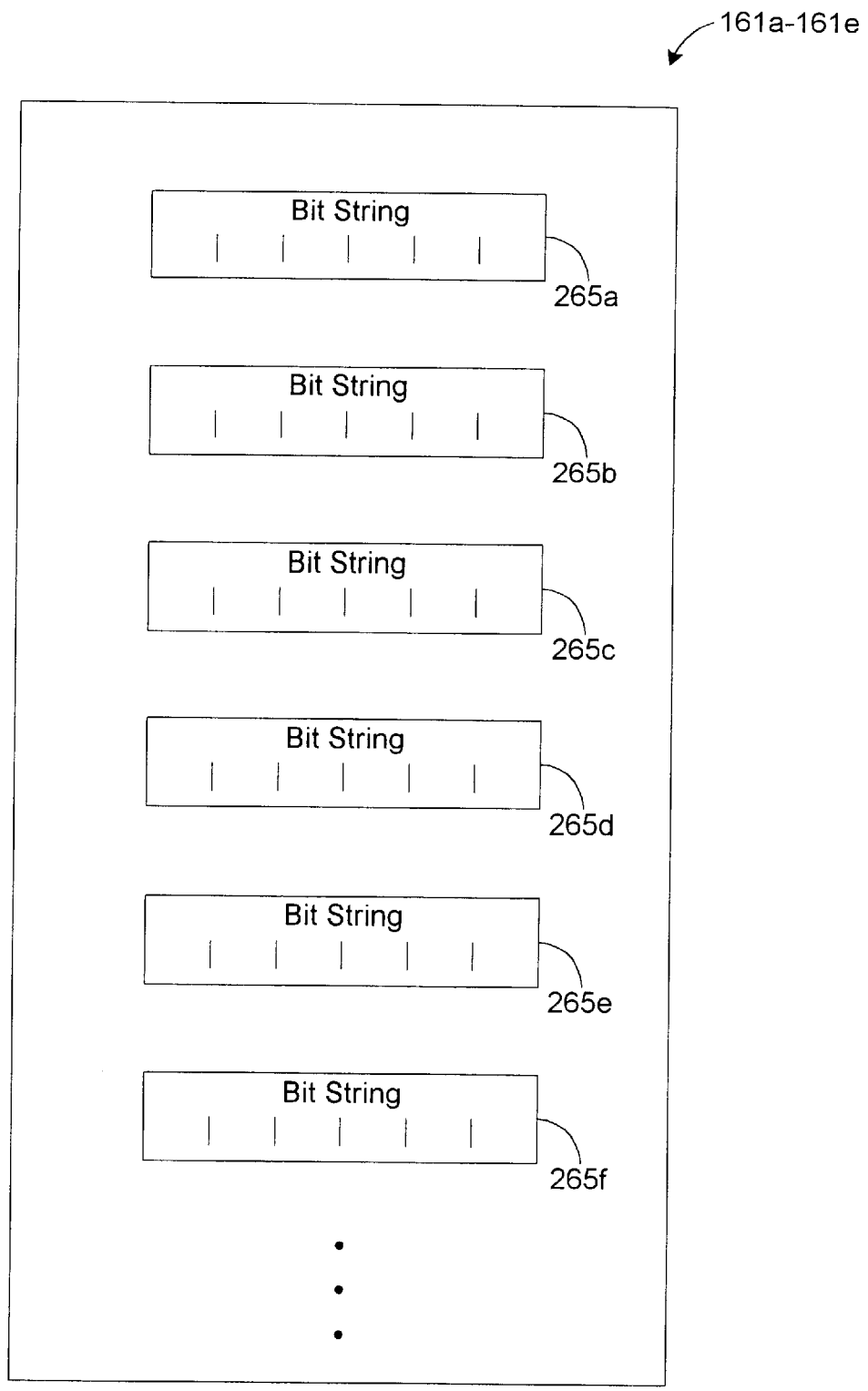
FIG. 10 is a block diagram illustrating a more detailed view of any one of the checksum indicators depicted in FIGS. 7A and 7B.

The checksum indicators 161a–161e can be implemented via various techniques. In the preferred embodiment as shown by FIG. 10, each checksum indicator 161a–161e is implemented as a plurality of bit strings 265a–265f, one bit string 265a–265f for each memory location having a different memory unit offset. Each bit string 265a–265f preferably has a number, n, of bits, in which n corresponds to the number of memory systems 139a–139e within the processing system 115. In the embodiment shown by FIG. 5, the system 115 includes five memory systems 139a139e, and each bit string 265a–265f of each checksum indicator 161a–161e should, therefore, include five active bits. Each active bit within each bit string 265a–265e corresponds to one of the memory systems 139a–139e.

In the aforementioned example in which the memory system 139b receives a write request from mapper 146, the bit string 265a–265f of the checksum indicator 161b correlated with the destination should be appropriately set to indicate that the memory system 139a is storing the checksum associated with the destination. In this regard, assume that bit string 265f of checksum indicator 161b is correlated with the destination. Within the bit string 265f, the bit corresponding to the system 139a is preferably asserted, and the remainder of the bits in the bit string 265f are preferably deasserted. Therefore, by determining which of the bits of bit string 265f is asserted, the memory controller 152b can determine that memory system 139a is storing the checksum associated with the destination. Thus, the memory controller 152b should be aware that the memory system 139a is storing the checksum that should be updated based on the result of the exclusive or operation performed by the memory controller 152b in block 214 of FIG. 9.

Any bit string 265a–265f correlated with a memory location that is storing a checksum preferably identifies its own memory system 139a–139e. Thus, in the checksum indicator 161 a of the foregoing example, the bit string 265f correlated with the checksum location in memory unit 155a preferably includes five bits corresponding respectively with memory systems 139a–139e. The bit corresponding with memory system 139a is preferably asserted to indicate that memory system 139a is storing a checksum at the correlated location (i.e., at the checksum location). Note that if the checksum location was storing a non-checksum value instead of a checksum value, then the foregoing bit would be deasserted.

Moreover, when the memory controller 152a receives the checksum update request containing the exclusive or result transmitted from memory controller 152b in block 219 of FIG. 9, the memory controller 152a in analyzing the aforementioned bit string 265f of checksum indicator 161 a can determine that the received checksum update request is for the purpose of updating a checksum instead of storing the data value (i.e., the exclusive or result) that is included in the checksum update request. Therefore, instead of storing the exclusive or result included in the received checksum update request and attempting to update a checksum in another memory system 139b 139e, the memory controller 152a updates the checksum stored at the checksum location according to the aforementioned techniques. In this regard, the memory controller 152a exclusively ors the exclusive or result included in the received checksum update request with the checksum previously stored in the checksum location and then stores the result of this exclusive or operation in the checksum location.

In the preferred embodiment, any bit string 265a–265f correlated with a memory location storing a checksum also indicates which memory systems 139a–139e are active. In this regard, a bit string 265a–265f indicates a memory system 139a–139e as being "active" when the memory system 139a–139e is operational and is enabled for updating the checksum stored in the memory location that is correlated with the bit string 265a–265f. Thus, in the checksum indicator 161a of the foregoing example, each bit of the bit string 265f that is correlated with the checksum location is initially asserted, assuming that memory systems 139a–139e are all operational. The asserted bit corresponding to memory system 139a indicates that memory system 139a is storing a checksum at the location correlated with the bit string 265f, and the asserted bits corresponding with memory systems 139b–139e indicate that memory systems 139b–139e are active. If memory systems 139c and 139d are active and memory system 139b is inactive (e.g., inoperable), then only the bits corresponding with memory systems 139a, 139c, and 139d should be asserted. By analyzing the foregoing bit string 265f in such an example, it should be apparent that memory system 139a is storing a checksum at the location correlated with the bit string 265f, that memory systems 139c and 139d are active, and that memory system 139b is inactive.

In the preferred embodiment, a memory controller 152a–152e that receives a checksum update request first analyzes the bit string 265a–265f associated with the memory location of the checksum before updating the checksum. Based on the foregoing bit string 265a–265f, the memory controller 152a-152e determines whether or not the checksum update request was transmitted from an active memory system 139a–139e. If the request was transmitted from an active memory system 139a–139e, then the foregoing memory controller 152a–152e updates the checksum. However, if the request was transmitted from a memory system 139a–139e identified by the bit string 265a–265f as inactive, then the foregoing memory controller 152a–152e ignores the request and refrains from updating the checksum.

To enable data recovery according to techniques that will be described in more detail hereinafter, the checksum update request transmitted from the memory controller 152b to memory controller 152a in block 219 of FIG. 9 preferably includes the memory system identifier of the transmitting memory system 139b in addition to the memory system identifier of memory system 139a. Based on the memory system identifier that identifies memory system 139a, the memory controller 152a is responsive to the checksum update request, and based on the memory system identifier that identifies memory system 139b, the memory controller 152a is aware that the memory controller 152b of memory system 155b transmitted the checksum update request. In other words, the foregoing memory system identifier identifies which memory system 139b–139e transmitted the checksum update request.

Before updating the checksum value stored in the checksum location in block 225 of FIG. 9, the memory controller 152a first analyzes the checksum indicator 161a in block 231 of FIG. 9 to determine whether the checksum update request has been transmitted from an active memory system. More specifically, based on the memory system identifier that identifies memory system 139b in the write request, the memory controller 152a analyzes the bit corresponding with memory system 139b in the bit string 265f that is correlated with the checksum location. If this bit is asserted, then the memory system 139b is considered to be active. Therefore, the memory controller 152a updates the checksum in the checksum location based on the exclusive or result included in the checksum update request, as shown by block 225 of FIG. 9. However, if the foregoing bit is deasserted, then the memory system 139b is considered to be inactive. Therefore, the memory controller 152a ignores the checksum update request and refrains from updating the checksum in the checksum location based on the checksum update request. In other words, the memory controller 152a skips block 225 of FIG. 9.

Once a data value stored in one of the memory systems 139a–139e is lost (e.g., when the memory system 139a–139e storing the data value fails), the lost data value may be recovered by utilizing the checksum associated with the memory location of the lost data value and by utilizing the data values stored in the other active memory systems 139a–139e. In this regard, assume that each memory system 139a–139e is operational until a failure occurs in memory system 139b. Further assume that the mapper 146 receives a storage or a retrieval request for accessing the data value stored at the aforementioned destination location in memory system 139b. Since the memory system 139b is no longer operational, it is not possible for the received request to be satisfied. Moreover, the data value at the destination location has been lost.

However, it is possible for the lost data value to be recovered via the checksum stored in the checksum location (i.e., the location in memory unit 155a having the same memory unit offset as the destination location). More specifically, the lost data value can be recovered by exclusively oring the checksum at the checksum location with the data values presently stored in active memory systems 139c–139e at locations having the same memory unit offset as the checksum and destination location. In other words, the lost data value can be recovered by exclusively oring the other non-checksum values of the lost data value's checksum set with the checksum of the checksum set. Moreover, by utilizing the data recovery techniques that will be described hereafter, the recovery of the lost data value can occur without preventing the occurrence of data stores to the operational memory units 155a, 155c–155e during the recovery process.

To better illustrate the data recovery process, assume that the mapper 146 receives a retrieval or storage request for accessing the data value stored in the destination location of memory unit 155b after the memory system 139b has failed, as described above. In response to the retrieval or storage request, the mapper 146 translates the bus address of the retrieval or storage request to a memory unit address. The mapper 146 then transmits either a read request or a write request to memory system 139b requesting either the retrieval of the data value stored in the destination location or the storage of a data value to the destination location. Since the memory system 139b has failed, the request transmitted by the mapper 146 is not satisfied. The mapper 146 detects the failure of the memory system 139b to respond to the request, and in response, initiates a process for recovering the lost data value (i.e., the data value stored at the destination location within the failed memory system 139b) provided that such a recovery process is enabled.

In this regard, the mapper 146 preferably includes a data recovery indicator 171 that indicates whether such a data recovery process is enabled. Note that there are various methodologies that may be employed to indicate whether or not the data recovery process is enabled. In the preferred embodiment, the data recovery indicator 171 includes a plurality of bits, one bit for each different memory unit offset and, therefore, for each different checksum set. If the recovery of a data value in a particular checksum set is to be enabled, then the bit in the data recovery indicator 171 corresponding to the checksum set is preferably asserted. However, if the recovery of a data value in a particular checksum set is to be disabled, then the bit in the data recovery indicator 171 corresponding to the checksum set is preferably deasserted.

In the preferred embodiment, each bit in the data recovery indicator 171 is initially asserted to indicate that the data recovery process for each checksum set is enabled. However, as will be described in more detail hereafter, the checksum of a checksum set is replaced by a recovered data value during a process for recovering a data value of the checksum set. Thus, once the data recovery process is complete, the bit in the data recovery indicator 171 corresponding to the checksum set of the recovered data value is preferably deasserted to disable any further data recoveries in the checksum set.

Moreover, when the mapper 146 detects the failure of the memory system 139b to access a requested data value, as described above, the mapper 146 analyzes the bit in the data recovery indicator 171 that corresponds to the checksum set of the requested data value, which is referred to as the "lost data value." If the bit is asserted, then the process for recovering the lost data value is enabled, and the data recovery process continues. However, if the bit is deasserted, then the process for recovering the lost data value is disabled, and the data recovery process is terminated. In the present example, assume that the data recovery process for recovering the lost data value is enabled and that the data recovery process, therefore, continues.

Figure 11:
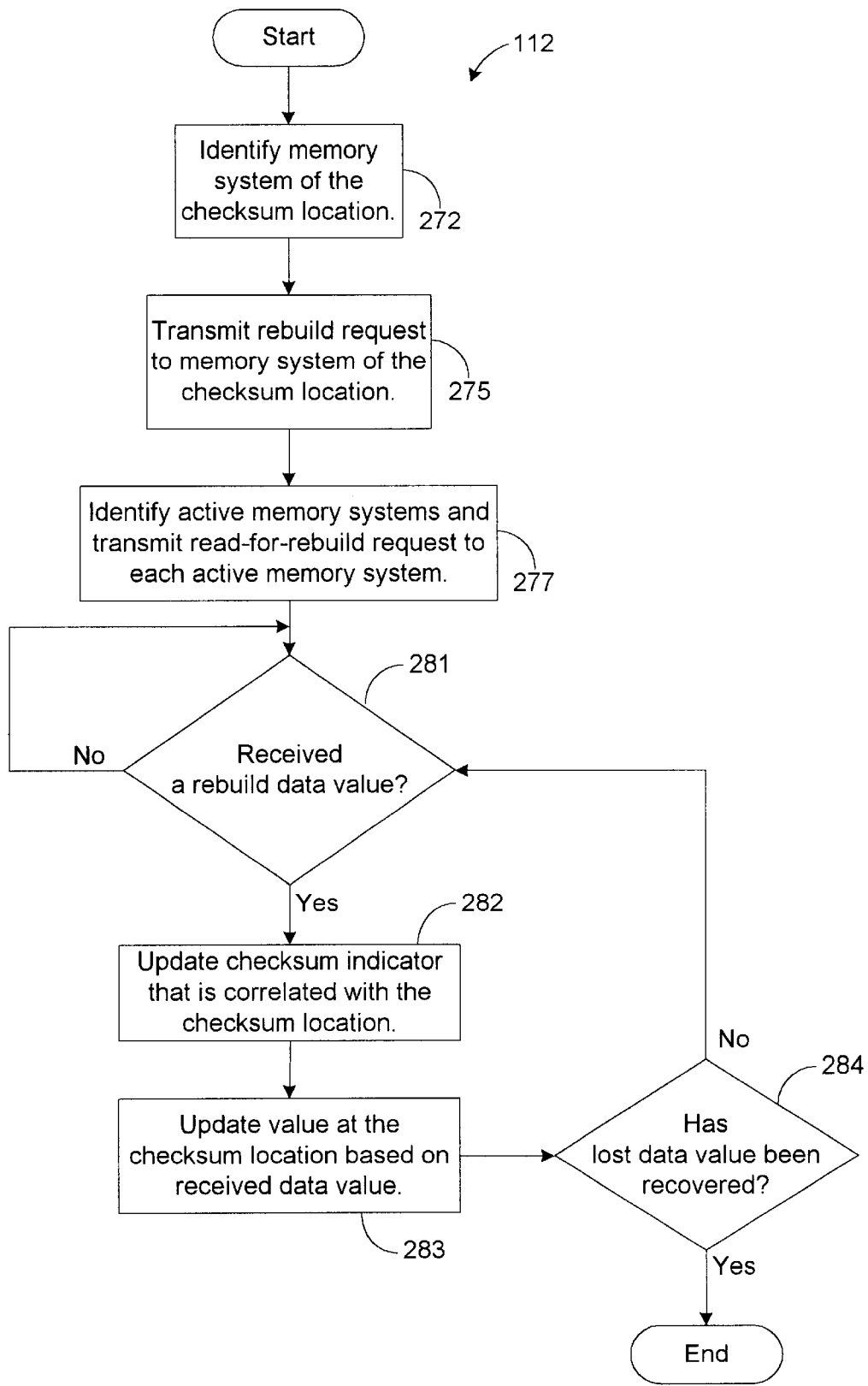
FIG. 11 is a flow chart illustrating the architecture and functionality of the computer system depicted by FIG. 4 in recovering a lost data value.

In implementing the data recovery process, the mapper 146 determines which of the other memory systems 139a, 139c–139e is storing the checksum of the lost data value, as shown by block 272 of FIG. 11. Thus, the mapper 146 preferably maintains a checksum indicator 172 that indicates which of the memory systems 139a–139e is storing the checksum that may be used to recover the lost data value. In the present example, the indicator 172 should identify memory system 139a, since the checksum associated with the memory location of the lost data value is stored in system 139a. There are a variety of methodologies that may be employed to identify the appropriate memory system 139a–139e that is storing the checksum associated with the memory location of a lost data value.

For example, for each memory unit offset, the checksum indicator 172 may include a bit string (not shown) having a bit for each memory system 139a–139e, similar to the checksum indicators 161a–161e stored in memory systems 139a–139e Each bit string is correlated with a different memory unit offset, and the bit string correlated with the same memory unit offset as the memory location of a lost data value is preferably used to indicate which memory system 139a–139e is storing the checksum of the lost data value. In this regard, the bit corresponding to the memory system 139a–139e storing the checksum of the lost data value is preferably asserted, and the remaining bits are preferably deasserted. Therefore, for any lost data value, the mapper 146 may analyze the checksum indicator 172 to determine which of the memory systems 139a–139e is storing the checksum associated with the memory location of the lost data value. This checksum should be stored in the identified memory system 139a–139e at a memory location having the same memory unit offset as the location of the lost data value.

Thus, in the foregoing example in which the checksum of the lost data value is stored in a memory location ("the checksum location") of memory unit 155a, the mapper 146 analyzes the checksum indicator 172 in block 272 of FIG. 11 and determines that memory system 139a is storing the checksum associated with the memory location of the lost data value. In response, the mapper 146 preferably transmits to memory system 139a a request to rebuild the lost data value, as shown by block 275 of FIG. 11. Included in this rebuild request is the memory unit offset of the destination (i.e., the location in memory unit 155b where the lost data value was stored) and a memory system identifier identifying the memory system 139b that was storing the lost data value.

In response, the memory controller 152a analyzes the checksum indicator 161a to determine which of the other memory systems 139c–139e are active with respect to the checksum location, as depicted by block 277 of FIG. 11. In the present example, assume that each of the memory systems 139c–139e are active at the time the memory controller 152a received the rebuild request. According to the techniques previously described for the preferred embodiment, the identification of the active memory systems 139c–139e is achieved by analyzing within checksum indicator 161a the bit string 265f correlated with the checksum location. Note that the checksum location should be the location within memory unit 155 a that is correlated with the memory unit offset included in the rebuild request received from mapper 146.

After identifying the other active memory systems 139c–139e, the memory controller 152a then requests retrieval of the data values in the active memory systems 139c–139e at locations corresponding to the same memory unit offset as the checksum location, as shown by block 277 of FIG. 11. In other words, the memory controller 152a requests, from each operational memory system 139c–139e, retrieval of the non-checksum value of the checksum set for the checksum that is being used to recover the lost data value.

More specifically, the memory controller 152a transmits a read-for-rebuild request to memory controller 152c requesting the memory controller 152c to retrieve the data value stored in memory unit 155c at the location correlated with the same memory unit offset as the one included in the rebuild request (i.e., the memory unit offset correlated with both the checksum and destination locations). The memory controller 152a also transmits a read-for-rebuild request to memory controller 152d requesting the memory controller 152d to retrieve the data value stored in memory unit 155d at the location correlated with the same memory unit offset as the one included in the rebuild request. In addition, memory controller 152a transmits a read-for-rebuild request to memory controller 152e requesting the memory controller 152e to retrieve the data value stored in memory unit 155e at the location correlated with the same memory unit offset as the one included in the rebuild request. Each of the read-for-rebuild requests may be transmitted in parallel or serially.

Note that a "read-for-rebuild request" transmitted during the data recovery process is a read request that instructs a retrieving memory controller 152a–152e to retrieve a data value presently stored in one of the memory units 155a–155e (it is not necessary to retrieve a newer copy from a processor cache) and to transmit the retrieved data value (hereafter referred to as the "rebuild data value") to the component that is responsible for rebuilding a data value based on the rebuild data value. In the preferred embodiment, the memory controller 152a transmitting the read-for-rebuild request is the component responsible for such rebuilding. Thus, in the present example, each of the memory controllers 152c–152e transmits its respective rebuild data value to the memory controller 152a in response to one of the foregoing read-for-rebuild requests. Preferably, each memory controller 152c–152e, in responding to its received read-for-rebuild request, transmits its memory system identifier along with the rebuild data value, as well as data indicating that the rebuild data value is in response to a previously transmitted read-for-rebuild request. Thus, when the memory controller 152a receives a rebuild data value, the memory controller 152a can determine (1) that the received data value is to be used for recovering the lost data value and (2) which memory system 152c–152e transmitted the received data value.

Note that a read-for-rebuild request for retrieving from a particular memory location should not be honored or satisfied until all previously received write requests for writing to the particular memory location have been completed along with their associated checksum updates. Similarly, a later write request to the particular memory location should not cause a checksum update until the read-for-rebuild is complete and the checksum controller has, for the checksum being used to recover the lost data value, disabled checksum updates from the memory controller associated with the particular memory location.

Thus, for each of the rebuild data values, the memory controller 152a updates the checksum indicator 161 a (block 282) and exclusively ors the rebuild data value with the value stored in the checksum location (block 283), as shown by blocks 281 284 of FIG. 11. In this regard, the memory controller 152a, in block 282, updates within the checksum indicator 161 a the bit string 265f correlated with the checksum location such that the memory controller 152c that transmitted the rebuild data value is no longer indicated as active by the bit string 265f In the preferred embodiment, this is accomplished by asserting, within the foregoing bit string 265f, corresponding to the memory system 139c–139e that transmitted the received rebuild data value.

Thus, when the memory controller 152a receives a rebuild data value transmitted from memory controller 152c, the memory controller 152a deasserts, within the foregoing bit string 265f, the bit corresponding to memory system 139c. Until this bit is deasserted, the checksum controller 152a should accept checksum update requests from the memory controller 152c that transmitted the rebuild data value and, therefore, update the checksum location based on the accepted checksum update request. Once the foregoing bit has been deasserted, the memory controller 152a, in performing block 283 of FIG. 11, exclusively ors the rebuild data value with the data value presently stored in the checksum location. The memory controller 152a then stores the result of this exclusive or operation in the checksum location to complete block 283.

In addition, when the memory controller 152a receives a rebuild data value transmitted from memory controller 152d, the memory controller 152a in block 282 deasserts, within the foregoing bit string 265f, the bit corresponding to memory system 139d. Once this bit has been deasserted, the memory controller 152a exclusively ors, in block 283, the rebuild data value with the data value presently stored in the checksum location. The memory controller 152a then stores the result of this exclusive or operation in the checksum location to complete block 283.

Furthermore, when the memory controller 152a receives a rebuild data value from memory controller 152e, the memory controller 152a in block 282 deasserts, within the foregoing bit string 265f) the bit corresponding to memory system 139e. Once this bit has been deasserted, the memory controller 152a exclusively ors, in block 283, the rebuild data with the data value presently stored in the checksum location. The memory controller 152a then stores the result of this exclusive or operation in the checksum location to complete block 283.

After completing each of the aforementioned steps, the data value stored in the checksum location should be the lost data value. Therefore, this data value may be transmitted to the mapper 146 as the data value recovered in response to the rebuild request and/or may be otherwise utilized as desired. In the preferred embodiment, the recovered data value is stored in the checksum location. Thus, the data recovery process effectively replaces the checksum of the checksum location with the recovered data value. The mapper 146 should be updated such that bus addresses previously mapped to the location of the lost data value are instead mapped to the checksum location. Since there is no longer a checksum associated with the checksum set, all attempts to recover a data value from the checksum set should be disabled. This can be accomplished by deasserting, in the data recovery indicator 171, the bit corresponding with the memory unit offset of the checksum location. Commands from the system manager 136 may instruct the mapper 146 to perform the foregoing update to the mappings and to the data recovery indicator 171.

It should be noted that once the recovery of the lost data value is complete, each of the processing units 17a–17e may be queried to determine whether or not the queried processing unit 17a–17e has a more current version of the lost data value than the version stored in the checksum location. If any of the processing units 17a–17e has a more current version, then the value in the checksum location may be overwritten with the more current version.

It should be further noted that the step, in block 282 of FIG. 11, of changing the active status of a memory controller 152a–152e that transmitted a received rebuild data value is significant for enabling the occurrence of data stores to the operable memory systems 139a, 139c–139e during the data recovery process depicted by FIG. 11. In this regard, the foregoing step prevents checksum updates from causing errors in the data recovery process.

In particular, to prevent errors in the data recovery process, each checksum update request transmitted by a particular memory controller 152a–152e in block 219 of FIG. 9 before the particular memory controller 152a–152e responds to a read-for-rebuild request (i.e., a request transmitted in block 277 of FIG. 11) should be satisfied by the memory controller 152a–152e that is rebuilding the lost data value. The satisfaction of such checksum update requests ensures that the checksum used in the recovery process is consistent with the rebuild data value transmitted by the particular memory controller 152a–152e during the data recovery.

Yet, each checksum update request transmitted by the particular memory controller 152a–152e in block 219 of FIG. 9 after the particular memory controller 152a–152e responds to a read-for-rebuild request (i.e., a request transmitted in block 277 of FIG. 11) should not be satisfied by the memory controller 152a–152e that is rebuilding the lost data value. The satisfaction of such requests would probably cause an error in the data recovery process. Moreover, by performing block 282 of FIG. 11 and block 231 of FIG. 9, the satisfaction of such requests is prevented, thereby preventing potential data recovery errors when data stores to the memory systems 139a–139e are allowed during the data recovery.

To ensure that blocks 231 and 282 successfully prevent satisfaction of all such requests, the memory controllers 152a–152e should ensure that all previous checksum update requests for the data requested by a read-for-rebuild request will be completed before responding with the rebuild data. Before processing any new requests for the data, the memory controller 152a–152e responding to a read-for-rebuild request should also ensure that the read-for-rebuild is complete and that the checksum controller that receives the rebuild data will not accept any more of its checksum update requests for updating the checksum of the checksum set.

The foregoing description describes a process by which a data value that is within a particular checksum set and that is stored in a failed memory system 139b can be recovered by utilizing the checksum of the checksum set and the other non-checksum data values of the checksum set. In the preferred embodiment, the recovered data value is stored in the checksum location that previously stored the checksum of the checksum set. Thus, in the foregoing example, the recovered data value is stored in memory unit 155a at the location identified by the same memory unit offset as the destination location in memory unit 155b (i.e., the location of the lost data value) and the locations in memory units 155c–155e storing the non-checksum values of the checksum set.

Figure 12:
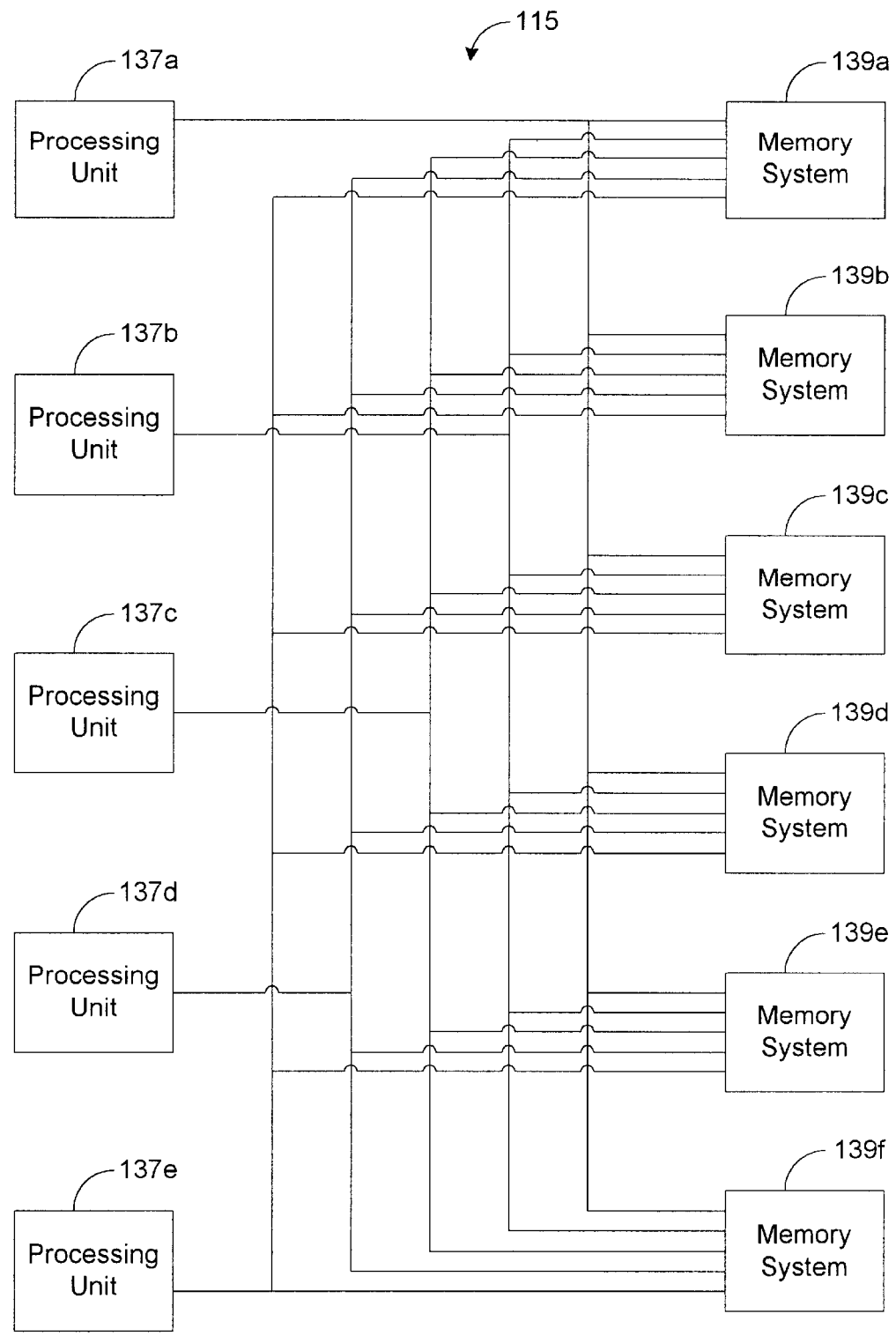
FIG. 12 is a block diagram illustrating another embodiment of the processing system depicted in FIG. 5. This embodiment includes an additional memory system that may be used to build a checksum according to the techniques of the present invention.

However, since the checksum of the checksum set is replaced with the recovered data value, there is no longer a checksum associated with the checksum set. Therefore, if another memory system 139a, 139c–139e fails, the data value in the checksum set of the other failed memory system 139a, 139c–139e will not be recoverable unless additional steps are taken to backup the checksum set after recovery of the first lost data value. The following is a description of how an additional memory system 139f (FIG. 12) may be used to backup the checksum set in the preferred embodiment.

Figure 13:
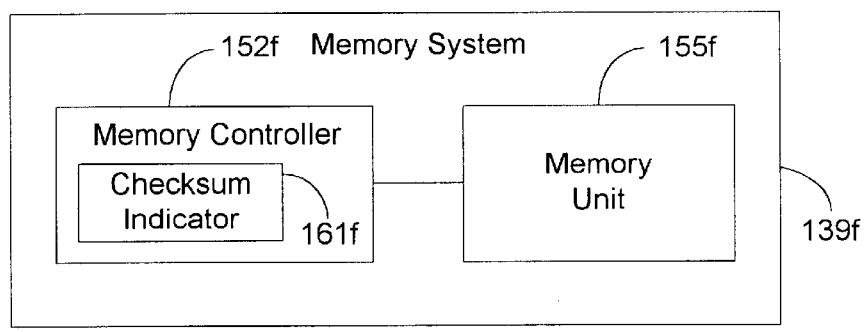
FIG. 13 is a block diagram illustrating a more detailed view of the additional memory system depicted in FIG. 12.
Figure 14:
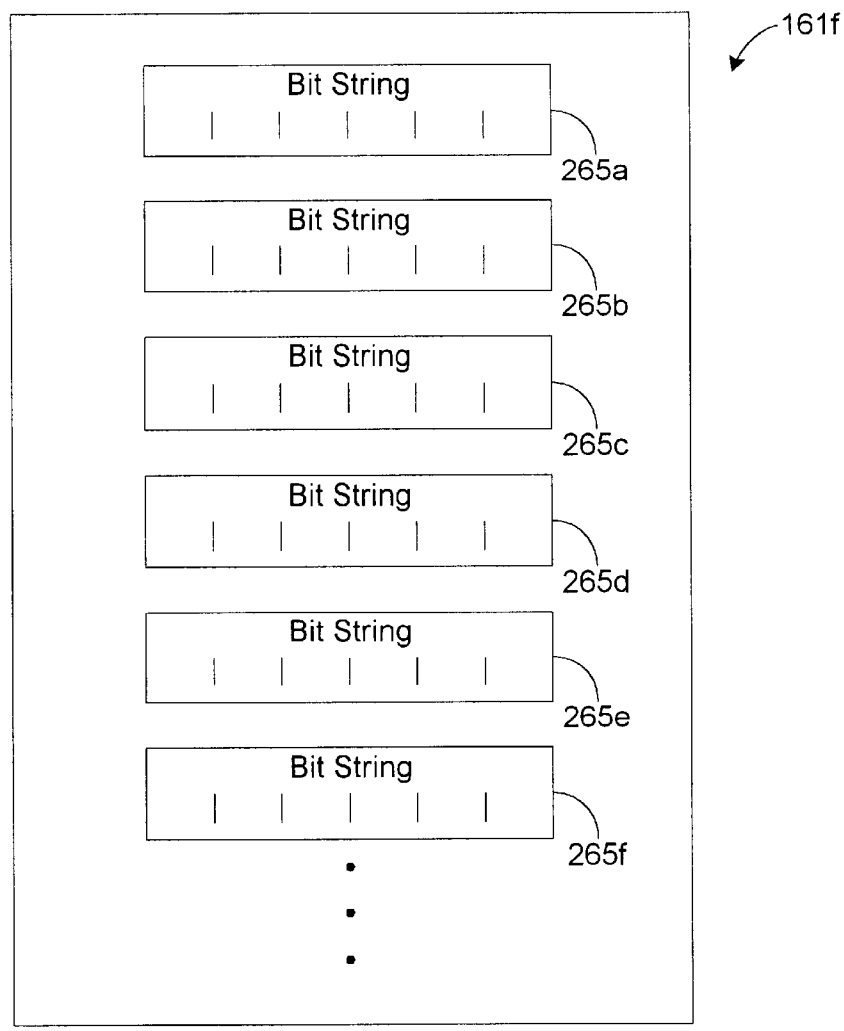
FIG. 14 is a block diagram illustrating a more detailed view of a checksum indicator depicted in FIG. 13.

As shown by FIGS. 7A, 7B, and 13, the additional memory system 139f is configured similar to the other memory systems 139a–139e. In this regard, the memory system 139f includes a memory unit 155f having a plurality of memory locations for storing data. Each memory location is identified by a different memory unit offset. Furthermore, a memory controller 152f is configured to access (i.e., store and retrieve) data in memory unit 155f according to the same techniques previously described for memory controllers 152a–152e. Thus, as shown by FIG. 14, the memory system 139f may include a checksum indicator 161 f, similar to checksum indicators 161a–161e, to enable the memory controller 152f to initiate checksum updates according to the techniques previously described. Thus, in the preferred embodiment, the checksum indicator 161f includes multiple bit strings 265a–265f that each have at least one bit for each active memory system 139a–139f Moreover, memory system 139f may have been within and/or used for data storage by the system 115 before and/or during the recovery of the lost data value from failed memory system 139b. Alternatively, memory system 139f may have been added to the system 115 after failure of the memory system 139b and/or after the data recovery process previously described. In any event, memory unit 155f should have a memory location that is identified by the same memory unit offset as the locations storing the other data values of the checksum set and that is not being used to store a valid data value. Furthermore, in an embodiment that includes both memory system 139b and memory system 139f, each of the bit strings within checksum indicators 161a–161f, 171, and 172 should include an additional bit corresponding to the additional memory system 139f so that the memory system 139f may be utilized according to the same techniques described for memory systems 139a–139e. Alternatively, when memory system 139f is installed to replace failed memory system 139b, the bit in the bit strings 161 a, 161c–161f, 171 and 172 that previously corresponded to memory system 139b may be utilized for corresponding to memory system 139f, thereby eliminating the need of an additional bit.

In the preferred embodiment, the foregoing memory location of the additional memory unit 155f is used to build and maintain a checksum of the checksum set that includes the previously recovered data value. This memory location of memory unit 155f that is to store the foregoing checksum shall be referred to hereafter as the "new checksum location," and the memory location, which is previously described herein as the "checksum location," of memory system 139a storing the recovered data value shall be referred to herein as the "old checksum location."

Thus, once the aforementioned data recovery process is complete, the old checksum location should be storing the recovered data value, which is one of the non-checksum data values of the checksum set. Further, the old checksum location and the new checksum location should have the same memory unit offset, which should be the same memory unit offset that identifies each of the memory locations within memory units 139c–139e storing the other non-checksum data values of the checksum set.

Figure 15:
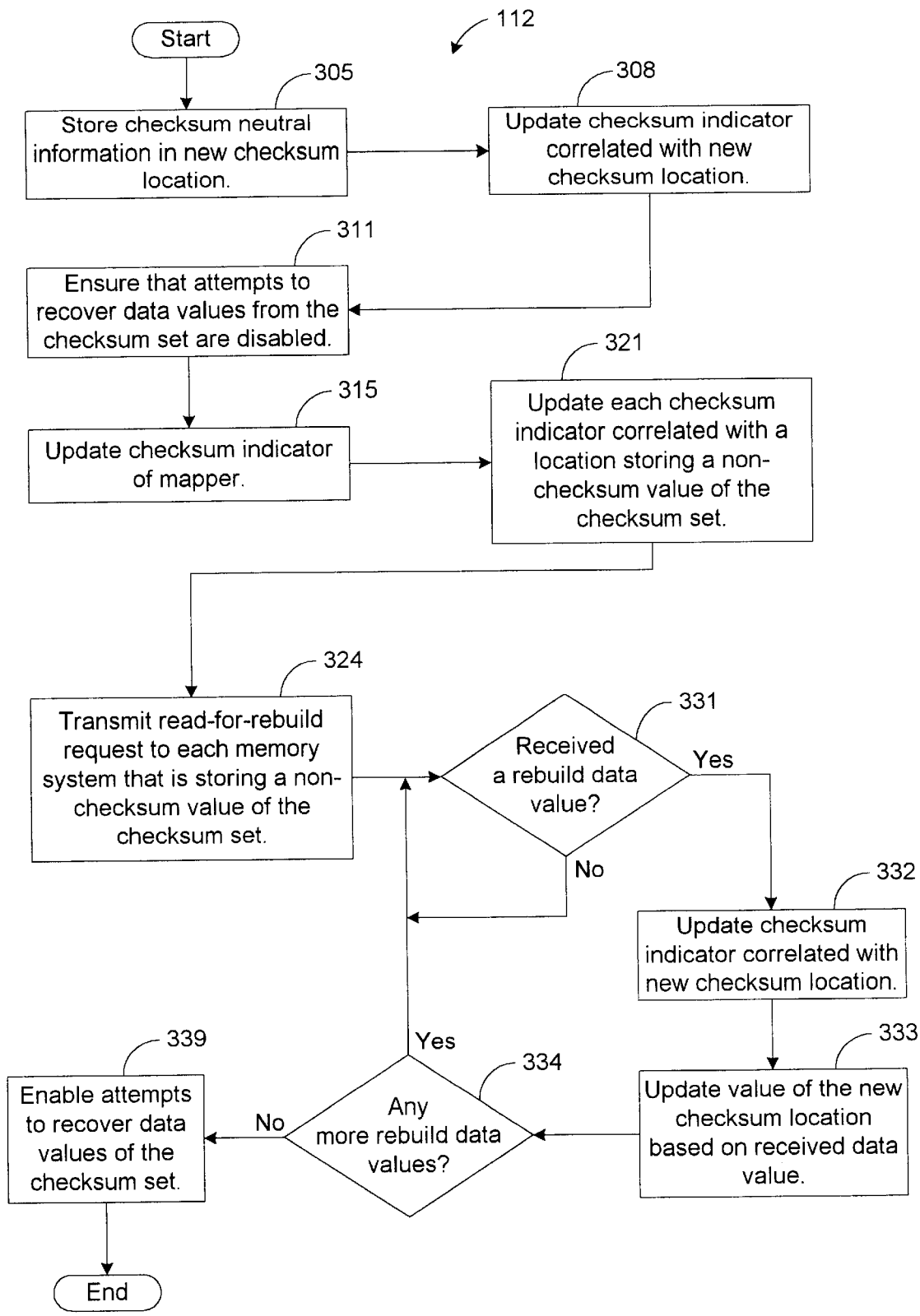
FIG. 15 is flow chart illustrating the architecture and functionality of the computer system depicted by FIG. 4 in building a checksum.

Initially, in block 305 of FIG. 15, checksum neutral information is stored in the new checksum location. The system manager 136 may accomplish the foregoing in the preferred embodiment by causing the value of zero to be stored in the new checksum location. Further, except for the bit corresponding to memory system 139f, each bit of the checksum indicator 161f correlated with the new checksum location is deasserted, in block 308 of FIG. 15, to indicate that any received checksum update request for updating the new checksum location should be ignored by the memory controller 152f In block 311, the system manager 136 ensures that attempts to recover data values from the checksum set are disabled. In the preferred embodiment, the system manager 136 accomplishes the foregoing by transmitting, to mapper 146, a command to disable such recovery attempts. In response, the mapper 146 deasserts, in the data recovery indicator 171, the bit corresponding to the checksum set, thereby disabling recovery attempts for recovering a data value of the checksum set.

Next, in block 315, the system manager 136 causes an update to the checksum indicator 172 of mapper 146 such that the checksum indicator 172 identifies the memory system 139f as containing the checksum of the checksum set. In the preferred embodiment, the foregoing is accomplished by commanding the mapper 146 to update within the checksum indicator 172 the bit string correlated with the memory unit offset of the old and new checksum locations. In other words, the foregoing is accomplished by commanding the mapper 146 to update within the checksum indicator 172 the bit string correlated with the checksum set. More specifically, the system manager 136 instructs the mapper 146 to update the foregoing bit string such that the bit corresponding to the memory system 139f of the new checksum location is asserted and such that the remaining bits are deasserted. By implementing block 315, any future attempt to recover one of the data values in the checksum set should utilize the data value stored at the new checksum location as the checksum for the checksum set.

In block 321, the system manager 136 commands each of the operable memory controllers 152a, 152c–152e (other than the new checksum memory controller 152f) to update their respective checksum indicators 161a, 161c–161e. In this regard, each of the memory controllers 152a, 152c–152e updates its respective checksum indicator 161a, 161c–161e such that the checksum indicator 161a, 161c–161e identifies the memory system 139f as storing the checksum of the checksum set. In particular, the bit string 265f in each of the checksum indicators 161a, 161c–161e correlated with the checksum set is updated such that the bit corresponding to the memory system 139f is asserted and such that the remaining bits are deasserted.

Therefore, when one of the memory controllers 152a, 152c–152e that has been updated in block 321 receives a write request instructing the memory controller 152a, 152c–152e to overwrite a data value of the checksum set (i.e., to overwrite a data value stored in a memory location identified by the same memory unit offset as the new checksum location), the one memory controller 152a, 152c–152e, pursuant to the techniques previously described, should transmit a checksum update request to memory system 139f. This checksum update request should identify the new checksum location as the location to be updated in response to the request and should identify which memory controller 152a, 152c–152e transmitted the request. However, at this point in the checksum build process, any such checksum update request should be ignored since the checksum indicator 161f, via block 308, indicates that each memory controller 152a, 152c–152e is disabled from updating the new checksum location.

After block 321, the system manager 136 then instructs the checksum controller 152f to update the value in the new checksum location such that the value represents the checksum of the checksum set. In response, the checksum controller 152f transmits, in block 324, a read-for-rebuild request to each of the other operable memory controllers 152a, 152c–152e. The read-for-rebuild requests may be transmitted in parallel or may be transmitted serially.

Each read-for-rebuild request transmitted in block 324 may be the same as a read-for-rebuild request transmitted in block 277 of FIG. 11 except that the request instructs a retrieving memory controller to transmit the retrieved data value (i.e., the "rebuild data value") to the component that is responsible for building a checksum consistent with each non-checksum data value of the associated checksum set. In the present example, the memory controller 152f is responsible for building the checksum. Thus, each of the memory controllers 152a, 152c–152e transmits its respective rebuild data value to the memory controller 152f in response to one of the foregoing read-for-rebuild requests.

As with the read for rebuild requests transmitted in block 277, each memory controller 152a, 152c–152e, in responding to its received read-for-rebuild request, transmits its memory system identifier along with the rebuild data value (i.e., the data value retrieved in response to the received read-for-rebuild request), as well as data indicating that the rebuild data value is in response to a previously transmitted read-for-rebuild request. Thus, when the memory controller 152f receives a rebuild data value, the memory controller 152f can determine (1) that the received data value is to be used for building a checksum of the checksum set and (2) which memory system 152a, 152c–152e transmitted the received data value.

Note that a read-for-rebuild request for retrieving from a particular memory location should not be honored or satisfied until all previously received write requests for writing to the particular memory location have been completed and until it can be ensured that any checksum update request associated with any such write request will not cause an update to the new checksum location. The foregoing may be accomplished by not satisfying the foregoing read-for-rebuild request until each previous write request has been completed and until its associated checksum update request has been received and ignored by memory controller 152f Similarly, a later write request to the particular memory location should not cause a checksum update until the read-for-rebuild is complete and the checksum controller 152f has, for the new checksum location, enabled checksum updates from the memory controller associated with the particular memory location.

In responding to a received rebuild data value, the memory controller 152f updates the checksum indicator 161f (block 332) and exclusively ors the rebuild data value with the value stored in the new checksum location (block 333), as shown by blocks 331–334 of FIG. 14. In this regard, the memory controller 152f, in block 332, updates within the checksum indicator 161f the bit string 265f correlated with the new checksum location such that the memory controller 152a, 152c–152e that transmitted the rebuild data value is indicated as active by the bit string 265f In the preferred embodiment, this is accomplished by asserting, within the foregoing bit string 265f, the bit corresponding to the memory system 139a, 139c–139e that transmitted the received rebuild data value.

Thus, when the memory controller 152f receives a rebuild data value transmitted from memory controller 152a, the memory controller 152f asserts, within the foregoing bit string 265f, the bit corresponding to memory system 139a. Until this bit is asserted, the checksum controller 152f should ignore checksum update requests from the memory controller 152a that transmitted the rebuild data value. Once the foregoing bit has been asserted, the memory controller 152f, in performing block 333 of FIG. 15, exclusively ors the rebuild data value with the data value presently stored in the new checksum location. The memory controller 152f then stores the result of this exclusive or operation in the new checksum location to complete block 333.

In addition, when the memory controller 152f receives a rebuild data value transmitted from memory controller 152c, the memory controller 152f in block 332 asserts, within the foregoing bit string 265f, the bit corresponding to memory system 139c. Once this bit has been asserted, the memory controller 152f exclusively ors, in block 333, the rebuild data value with the data value presently stored in the new checksum location. The memory controller 152f then stores the result of this exclusive or operation in the new checksum location to complete block 333.

Furthermore, when the memory controller 152f receives a rebuild data value from memory controller 152d, the memory controller 152f in block 332 asserts, within the foregoing bit string 265f, the bit corresponding to memory system 139d. Once this bit has been asserted, the memory controller 152f exclusively ors, in block 333, the rebuild data with the data value presently stored in the new checksum location. The memory controller 152f then stores the result of this exclusive or operation in the new checksum location to complete block 333.

Finally, when the memory controller 152f receives a rebuild data value from memory controller 152e, the memory controller 152f in block 332 asserts, within the foregoing bit string 265f, the bit corresponding to memory system 139e. Once this bit has been asserted, the memory controller 152f exclusively ors, in block 333, the rebuild data with the data value presently stored in the new checksum location. The memory controller 152f then stores the result of this exclusive or operation in the new checksum location to complete block 333.

After completing each of the aforementioned steps, the data value stored in the new checksum location should represent the checksum of the checksum set. In other words, the data value stored in the new checksum location should represent the checksum of the non-checksum data values stored in memory units 155a, 155c–155e at locations having the same memory unit offset as the new checksum location. Furthermore, when any of the memory controllers 152a, 152c–152e transmits a checksum update request in response to a write request that overwrites one of the data values of the checksum set, the memory controller 152f updates the checksum at the new checksum location such that the checksum is consistent with the present non-checksum data values of the checksum set. Therefore, if any one of the memory systems 139a, 139c–139e fails, the lost data value that is within the checksum set may be recovered by utilizing the checksum in the new checksum location according to techniques previously described herein for recovering lost data values.

Thus, in block 339, attempts to recover one of the data values of checksum set are enabled. In this regard, the system manager 136 may transmit a command to the mapper 146 instructing the mapper 146 to update the data recovery indicator 171 for enabling such data recovery attempts. In responding to such a command, the mapper 146 should assert the bit in the data recovery indicator 171 that corresponds to the checksum set.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A system for building checksums, comprising:
   a plurality of memory units, each of said memory units having a plurality of memory locations;
   a plurality of memory controllers, each of said memory controllers configured to access memory locations within a respective one of said memory units, one of said memory controllers configured to build a checksum in one of said memory locations; and
   an indicator configured to indicate which of said plurality of memory controllers are enabled for updating said one memory location,
   wherein said one memory controller, in building said checksum value, is configured to perform the following steps:
      setting said indicator to indicate that each of the other memory controllers is disabled from updating said one memory location;
      transmitting, subsequent to said setting step, read-for-rebuild requests to each of said other memory controllers;
      receiving rebuild values that have been retrieved from said memory units in response to said read-for-rebuild requests;
      updating said one memory location with each of said rebuild values; and
      changing, for each of said rebuild values and in response to receiving said each rebuild value, said indicator to indicate that the memory controller that transmitted said each rebuild value is enabled for updating said one memory location.

2. The system of claim 1, wherein each of said rebuild values is stored in a respective memory location having the same memory unit offset as said one memory location.

3. The system of claim 1, wherein another of said memory controllers is configured to receive a write request and to write a data value associated with said write request into a memory location identified by said write request, said other memory controller further configured to form a combined value by combining said data value with a data value previously stored in said memory location identified by said write request, said other memory controller further configured to transmit said combined value to said one memory controller, wherein said one memory controller is configured to update said one memory location based on and in response to said combined value only if said indicator indicates that said other memory controller is enabled for updating said one memory location when said one memory controller receives said combined value.

4. A system for building a checksum, comprising:
   a plurality of memory units, each of said memory units having a plurality of memory locations;
   a plurality of memory controllers, each of said memory controllers for accessing memory locations within a respective one of said memory units;
   means for indicating which of said controlling means are enabled for updating one of said memory locations in one of said memory units;
   means for setting said indicating means to indicate that each of said memory controllers is disabled from updating said one memory location;
   means for transmitting read-for-rebuild requests to each of said memory controllers;
   means for receiving rebuild values that have been retrieved from said memory units by said memory controllers in response to said read-for-rebuild requests;
   means for updating said one memory location with each of said rebuild values; and
   means for changing, for each of said rebuild values and in response to said receiving means receiving said each rebuild value, said indication means to indicate that the memory controller that transmitted said each rebuild value is enabled for updating said one memory location.

5. The system of claim 4, wherein one of said memory controllers is configured to retrieve, in response to one of said read-for-rebuild requests, one of said rebuild values from a memory location, and wherein said system further comprises:
   means for utilizing a data value stored in said one memory location to recover a data value stored in said memory location accessed via said one memory controller in retrieving said one rebuild value.

6. The system of claim 4, wherein each of said rebuild values is stored in a respective memory location having the same memory unit offset as said one memory location.

7. The system of claim 4, wherein one of said memory controllers is configured to receive a write request and to write a data value associated with said write request into a memory location identified by said write request, said one memory controller further configured to form a combined value by combining said data value with a data value previously stored in said memory location identified by said write request, said one memory controller further configured to transmit said combined value to said receiving means, wherein said updating means is configured to update said one memory location based on and in response to said combined value only if said indicating means indicates that said one memory controller is enabled for updating said one memory location when said receiving means receives said combined value.

8. A method for building a checksum, comprising the steps of providing a plurality of memory units, each of said memory units having a plurality of memory locations;

providing a plurality of memory controllers;

maintaining an indicator that is indicative of which of said memory controllers are enabled for updating one of said memory locations in one of said memory units;

setting said indicator to indicate that each of said memory controllers is disabled from updating said one memory location;

transmitting, subsequent to said setting step, read-for-rebuild requests to each of said memory controllers;

receiving rebuild values that have been retrieved from said memory units by said memory controllers in response to said read-for-rebuild requests, updating said one memory location with each of said rebuild values; and changing, for each of said rebuild values and in response to receiving said each rebuild value, said indicator to indicate that the memory controller that transmitted said each rebuild value is enabled for updating said one memory location.

9. The method of claim 8, further comprising the steps of:

retrieving one of said rebuild values from a memory location in response to one of said read-for-rebuild requests; and utilizing a data value stored in said one memory location to recover a data value stored in said memory location accessed via said retrieving step.

10. The method of claim 8, further comprising the step of retrieving, in response to said read-for-rebuild requests, each of said rebuild values from memory locations having the same memory unit offset as said one memory location.

11. The method of claim 8, further comprising the steps of:

storing a data value in another memory location, said other location within said memory units;

combining said data value with a data value previously stored in said other memory location to form a combined value;

transmitting, from one of said memory controllers, a request for updating said one memory location based on said combined value; and analyzing said indicator in response to said request; and updating said one memory location in response to said request only if said indicator indicates during said analyzing step that said one memory controller is enabled for updating said one memory location.

12. The method of claim 8, further comprising the steps of:

maintaining another indicator, said other indicator identifying one of said memory controllers;

updating, subsequent to said setting step, said other indicator to identify which of said memory controllers is capable of accessing said one memory location;

receiving, at another of said memory controllers, a write request for storing a data value;

analyzing said other indicator in response to said receiving a write request step; and transmitting a request for updating said one memory location based on said analyzing step.

\* \* \* \* \*

UNITED STATES PATENT AND TRADEMARK OFFICE
CERTIFICATE OF CORRECTION

PATENT NO. : 6,665,830 B2
DATED : December 16, 2003
INVENTOR(S) : Bryan Hornung et al.

It is certified that error appears in the above-identified patent and that said Letters Patent is hereby corrected as shown below:

Column 1,
Line 16, after "applications" insert a period

Column 4,
Line 58, delete "3 5a-35c" and insert therefor -- 35a-35c --

Column 5,
Line 61, delete "19a19c" and insert therefor -- 19a- 19c --

Column 6,
Line 55, after "begin" insert -- or --

Column 7,
Line 62, after "thereof" insert a period

Column 8,
Line 14, after "following" insert a colon

Column 9,
Line 29, delete "139a139e" and insert therefor -- 139a- 193e --

Column 11,
Lines 38 and 59, delete "139c139e" and insert therefor -- 139c- 193e --

Column 12,
Line 39, after "139b" insert a dash

Column 15,
Line 61, delete "161 a" and insert therefor -- 161a --

Column 16,
Line 3, delete "161 a" and insert therefor -- 161a --

Column 17,
Line 10, after "281" insert a dash
Line 12, delete "161 a" and insert therefor -- 161a --
Line 15, after "265f" insert a period

UNITED STATES PATENT AND TRADEMARK OFFICE
CERTIFICATE OF CORRECTION

PATENT NO. : 6,665,830 B2
DATED : December 16, 2003
INVENTOR(S) : Bryan Hornung et al.

It is certified that error appears in the above-identified patent and that said Letters Patent is hereby corrected as shown below:

<u>Column 19</u>,
Line 26, delete "152fis" and insert therefor -- 152f is --
Line 30, delete "161 f" and insert therefor -- 161f --

<u>Column 20</u>,
Line 22, after "152f" insert a period

<u>Column 21</u>,
Line 59, after "152f" insert a period

Signed and Sealed this

Third Day of May, 2005

JON W. DUDAS
*Director of the United States Patent and Trademark Office*